(12) United States Patent
Miwa

(10) Patent No.: US 6,333,782 B2
(45) Date of Patent: Dec. 25, 2001

(54) DISTANCE MEASURING APPARATUS

(75) Inventor: Yasuhiro Miwa, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/725,880

(22) Filed: Nov. 30, 2000

(30) Foreign Application Priority Data

Nov. 30, 1999 (JP) ................................. 11-340517

(51) Int. Cl.$^7$ ................ G01C 3/00; G01C 3/08; G02B 27/40; G02B 27/64; G02B 7/04; G02B 7/28; G03B 13/00
(52) U.S. Cl. ............... 356/3.04; 396/106; 396/120; 250/201.4; 250/201.6
(58) Field of Search .................. 356/3.04; 396/106, 396/120; 250/201.4–201.6

(56) References Cited

U.S. PATENT DOCUMENTS

| | | | |
|---|---|---|---|
| Re. 35,652 | * 11/1997 | Nonaka et al. | 396/104 |
| 5,742,524 | * 4/1998 | Ito et al. | 364/561 |
| 6,026,246 | * 2/2000 | Yoshida et al. | 396/106 |
| 6,195,510 | * 2/2001 | Yoshida | 396/106 |
| 6,246,467 | * 6/2001 | Yoshida | 356/3.01 |
| 6,292,256 | * 9/2001 | Yoshida | 356/3.04 |
| 6,292,257 | * 9/2001 | Yoshida | 356/3.04 |
| 6,295,124 | * 9/2001 | Yoshida | 356/3.04 |

FOREIGN PATENT DOCUMENTS 10-281758  10/1998  (JP).

* cited by examiner

Primary Examiner—Thomas H. Tarcza
Assistant Examiner—Brian Andrea
(74) Attorney, Agent, or Firm—Leydig, Voit, & Mayer, Ltd.

(57) ABSTRACT

A distance measuring apparatus projects light toward an object at a distance to be measured, detects reflected light at a position according to the distance to the object to output a position signal, generates a distance computation value based on the position signal, integrates the distance computation value with an integrating capacitor, detects the distance, based on distance data corresponding to the integrated result, charges the integrating capacitor with a constant current for a time, and calculates a voltage for the integrating capacitor. In the distance measuring apparatus, the distance to the object is determined, based on a correction voltage calculated in a ranging routine, a reference voltage of the integrating capacitor calculated before the ranging routine, and the distance data. The apparatus reduces ranging error due to a change in the capacitance of the integrating capacitor.

22 Claims, 10 Drawing Sheets

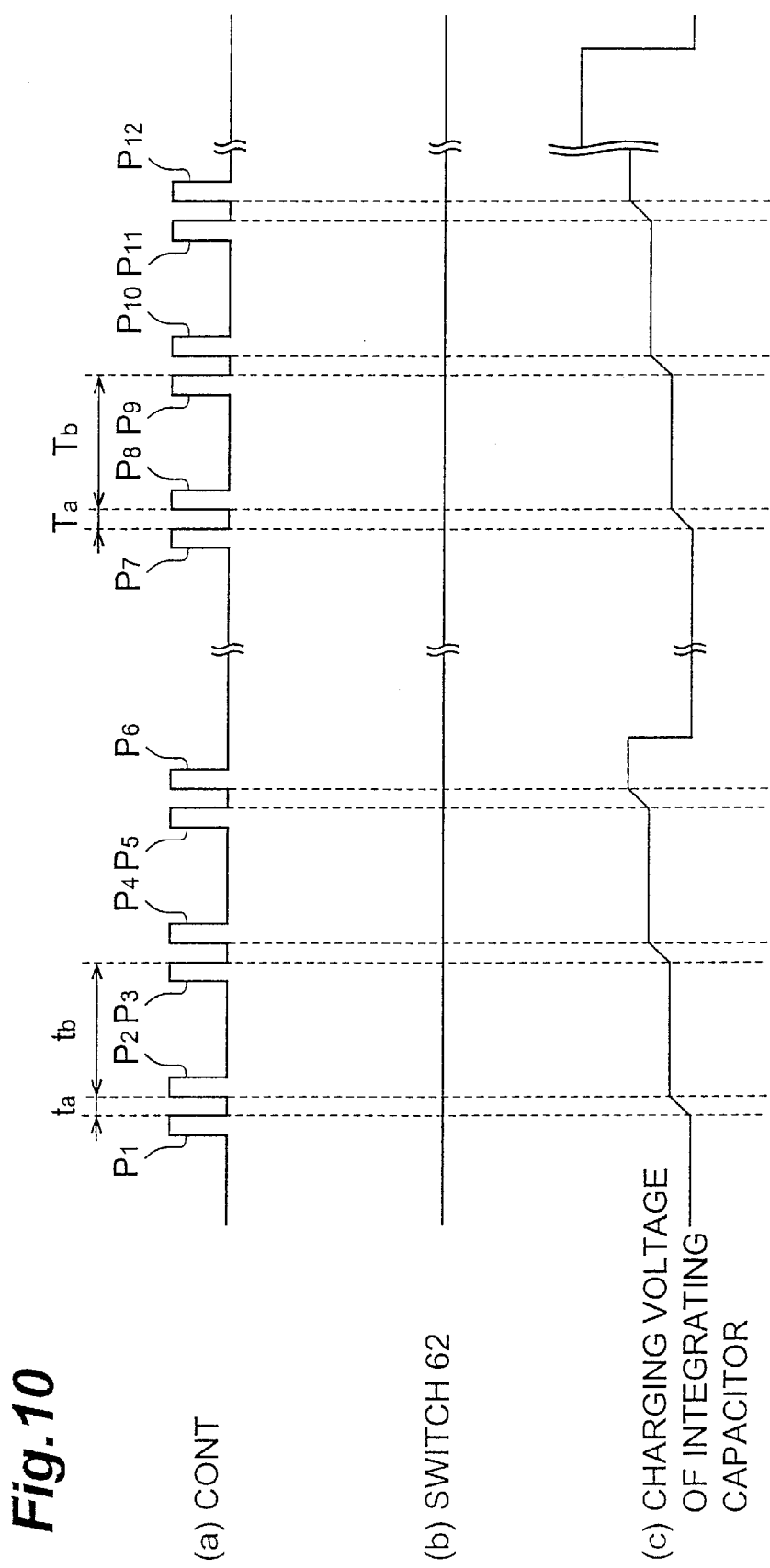

DISTANCE MEASURING APPARATUS

BACKGROUND OF THE INVENTION

1. Field of the Invention

The present invention relates to a distance measuring apparatus for measuring the distance to an object and, more particularly, to a distance measuring apparatus of an active type used in cameras and the like.

2. Related Background Art

The distance measuring apparatus of the active type used in the cameras and the like is normally constructed to detect the distance to the object in the following manner. First, an infrared emitting diode (hereinafter referred to as "IRED") projects a light beam toward the object and a position sensitive detector (hereinafter referred to as "PSD") detects reflected light of the thus projected beam. Output signals from this PSD are processed by signal processing circuits and a computing circuit and the computing circuit outputs the result of computation as distance data to a CPU. Then the CPU detects the distance to the object, based on this distance data.

Since there is the possibility of causing an error in distance measurement (ranging) based on only one light projection, it is conventional practice to employ a method of carrying out the light projection multiple times to generate a plurality of distance computation values and integrating the plurality of distance computation values with an integrating circuit provided with an integrating capacitor to effect averaging, as in the distance measuring apparatus described in Japanese Patent Application Laid-Open No. H10-281758. Then the CPU detects the distance to the object, based on distance data corresponding to the integration result of the integrating circuit.

The distance measuring apparatus constructed to integrate the distance computation values by use of the integrating capacitor, including the distance measuring apparatus described in the above Japanese application, however, had the following problem. Since the capacitor changes its capacitance with a change in ambient temperature, it posed the problem of ranging error. In addition, a capacitor has such characteristics as to change its capacitance with a lapse of time even in storage without being used, which was also the cause of the ranging error.

SUMMARY OF THE INVENTION

The present invention has been accomplished under such circumstances and an object of the invention is to provide a distance measuring apparatus that can reduce the ranging error due to the variation in the capacitance of the integrating capacitor.

(1) In order to achieve the above object, a distance measuring apparatus according to the present invention is an apparatus comprising light projecting means for projecting a beam toward an object to be measured; light receiving means for receiving reflected light of the beam projected toward the object, at a reception position according to a distance to the object and outputting a position signal according to the reception position; computing means for carrying out a predetermined operation based on the position signal from the light receiving means to generate a distance computation value according to the distance to the object; integrating means comprising an integrating capacitor, the integrating means charging or discharging the integrating capacitor according to the distance computation value generated by the computing means to integrate the distance computation value; detecting means for detecting the distance to the object, based on distance data corresponding to the result of integral in the integrating means; charging means for charging the integrating capacitor by letting a constant current flow for a predetermined time; and voltage calculating means for calculating a voltage of the integrating capacitor charged by the charging means, wherein the detecting means detects the distance to the object, based on a correction voltage being the voltage calculated by the voltage calculating means in a ranging routine, a reference voltage of the integrating capacitor preliminary calculated before the ranging routine, and the distance data.

In the distance measuring apparatus according to the present invention, the charging means charges the integrating capacitor by letting the constant current flow for the predetermined time in the ranging routine and the voltage calculating means calculates the correction voltage being the voltage of the integrating capacitor thus charged. The detecting means calculates the distance to the object, based on (1) this correction voltage, (2) the reference voltage of the integrating capacitor preliminarily calculated before the ranging routine, e.g., immediately after manufacturing of the distance measuring apparatus, and (3) the distance data corresponding to the integral result in the integrating means. The voltage after the flow of the constant current for the constant time in the integrating capacitor is related to the capacitance of the capacitor. Namely, the ranging error due to change in the capacitance of the integrating capacitor can be reduced, because the distance to the object is calculated with also considering the reference voltage, e.g., the voltage immediately after manufacturing and the correction voltage in actual ranging, in addition to the distance data.

It is preferable that the detecting means detect the distance to the object, based on corrected distance data Ra given by $Ra=(\alpha 1/\beta 1) \times D$ (where D is the distance data, $\alpha 1$ the reference voltage, and $\beta 1$ the correction voltage).

In this case, the detecting means detects the distance to the object, based on the corrected distance data Ra obtained by converting the distance data to data upon calculation of the reference voltage, for example, upon manufacturing of the distance measuring apparatus, which can reduce the ranging error due to the change in the capacitance of the integrating capacitor.

In the distance measuring apparatus according to the present invention, it is also preferable that the detecting means detect the distance to the object, based on corrected distance data Rb given by $Rb=[\alpha 1/\{(\beta 1-\alpha 1) \times A + \alpha 1\}] \times D + (\beta 1-\alpha 1) \times B$ (where D is the distance data, $\alpha 1$ the reference voltage, $\beta 1$ the correction voltage, and A and B correction coefficients).

The various members and housing constituting the distance measuring apparatus sometimes undergo distortion with change in ambient temperature. The distortion of the housing etc. will cause distortion of the optical system of the distance measuring apparatus, which can be the cause of degradation of ranging accuracy. In such cases, it is difficult to improve the ranging accuracy by simply making use of the value of the ratio of the reference voltage to the correction voltage. It thus becomes feasible to improve the ranging accuracy by employing such a configuration that the correction coefficient A and correction coefficient B of the distance measuring apparatus are preliminarily calculated and the detecting means detects the distance to the object, based on the above corrected distance data Rb.

Further, in the distance measuring apparatus according to the present invention, it is preferable that the detecting means detect the distance to the object, based on corrected distance data Ra given by Ra=($\alpha 1/\beta 1$)×D (where D is the distance data, $\alpha 1$ the reference voltage, and $\beta 1$ the correction voltage), when a difference between the correction voltage and the reference voltage is smaller than a predetermined value and that the detecting means detect the distance to the object, based on corrected distance data Rb given by Rb=[$\alpha 1/\{(\beta 1-\alpha 1)\times A+\alpha 1\}$]×D+($\beta 1-\alpha 1$)×B (where D is the distance data, $\alpha 1$ the reference voltage, $\beta 1$ the correction voltage, and A and B correction coefficients), when the difference between the correction voltage and the reference voltage is not less than the predetermined value.

In this case, when the difference between the correction voltage and the reference voltage is smaller than the predetermined value, the detecting means detects the distance to the object, based on the corrected distance data Ra without use of the correction coefficients, while assuming that the distortion is small in the housing etc. of the distance measuring apparatus with change in temperature. On the other hand, when the difference between the correction voltage and the reference voltage is not less than the predetermined value, the detecting means detects the distance to the object, based on the corrected distance data Rb with also utilizing the correction coefficient A and the correction coefficient B, while assuming that the distortion is large in the housing etc. of the distance measuring apparatus with change in temperature. Since the detecting means detects the distance to the object by use of the proper corrected distance data according to the degree of the distortion of the housing etc. as described, the ranging accuracy can be further improved.

In the distance measuring apparatus according to the present invention, the voltage calculating means may calculate the correction voltage before ranging in the ranging routine or may calculate the correction voltage after ranging in the ranging routine.

Further, it is preferable that the voltage calculating means calculate the voltage of the integrating capacitor before and after ranging in the ranging routine and that the detecting means detect the distance to the object, using an average of the voltage before the ranging and the voltage after the ranging as the correction voltage.

In this case, since the average of the voltage before the ranging and the voltage after the ranging is used as the correction voltage, when compared with the case wherein the correction voltage is calculated only either before the ranging or after the ranging, the distance is detected using the voltage corresponding to a capacitance closer to the capacitance of the integrating capacitor in actual ranging, which can further improve the ranging accuracy.

(2) Another distance measuring apparatus according to the present invention is an apparatus comprising light projecting means for projecting a beam toward an object to be measured; light receiving means for receiving reflected light of the beam projected toward the object, at a reception position according to a distance to the object and outputting a position signal according to the reception position; computing means for performing a predetermined operation based on the position signal outputted from the light receiving means to generate a distance computation value according to the distance to the object; integrating means comprising an integrating capacitor, the integrating means charging or discharging the integrating capacitor according to the distance computation value generated by the computing means to integrate the distance computation value; detecting means for detecting the distance to the object, based on distance data corresponding to the result of integral in the integrating means; charging means for charging the integrating capacitor by letting a constant current flow for a predetermined time; and capacitance calculating means for calculating a capacitance of the integrating capacitor charged by the charging means, wherein the detecting means detects the distance to the object, based on a correction capacitance being the capacitance calculated by the capacitance calculating means in a ranging routine, a reference capacitance of the integrating capacitor preliminarily calculated before the ranging routine, and the distance data.

In the distance measuring apparatus according to the present invention, the charging means charges the integrating capacitor by letting the constant current flow for the predetermined time in the ranging routine and the capacitance calculating means calculates the correction capacitance, based on the voltage of the integrating capacitor thus charged. Then the detecting means calculates the distance to the object, based on (1) this correction capacitance, (2) the reference capacitance of the integrating capacitor preliminarily calculated before the ranging routine, e.g., immediately after manufacturing of the distance measuring apparatus, and (3) the distance data corresponding to the integral result in the integrating means. Namely, the ranging error due to change in the capacitance of the integrating capacitor can be reduced, because the distance to the object is calculated with also considering the reference capacitance, e.g., the capacitance immediately after manufacturing and the correction capacitance in actual ranging, in addition to the distance data.

It is also preferable that the detecting means detect the distance to the object, based on corrected distance data Rc given by Rc=($\beta 2/\alpha 2$)×D (where D is the distance data, $\alpha 2$ the reference capacitance, and $\beta 2$ the correction capacitance).

In this case, the ranging error due to change in the capacitance of the integrating capacitor can be reduced, because the detecting means detects the distance to the object, based on the corrected distance data Rc obtained by converting the distance data to data upon calculation of the reference capacitance, e.g., upon manufacturing of the distance measuring apparatus.

In the distance measuring apparatus according to the present invention, it is also preferable that the detecting means detect the distance to the object, based on corrected distance data Rd given by Rd=[$\beta 2/\{((\alpha 2-\beta 2)\times A+\beta 2\}$]×D+ ($\alpha 2-\beta 2$)×B (where D is the distance data, $\alpha 2$ the reference capacitance, $\beta 2$ the correction capacitance, and A and B the correction coefficients).

With distortion of the housing etc. of the distance measuring apparatus due to the change in ambient temperature, the optical system of the distance measuring apparatus will be distorted, which can increase the possibility of degrading the ranging accuracy. In such cases, it is difficult to improve the ranging accuracy by simply making use of the value of the ratio of the reference capacitance to the correction capacitance. It thus becomes feasible to improve the ranging accuracy by employing such a configuration that the correction coefficient A and correction coefficient B of the distance measuring apparatus are preliminarily calculated and the detecting means detects the distance to the object, based on the above corrected distance data Rd.

Further, in the distance measuring apparatus according to the present invention, it is preferable that the detecting means detect the distance to the object, based on corrected distance data Rc given by Rc=($\beta 2/\alpha 2$)×D (where D is the distance data, $\alpha 2$ the reference capacitance, and $\beta 2$ the correction capacitance), when a difference between the correction capacitance and the reference capacitance is smaller than a predetermined value and that the detecting means detect the distance to the object, based on corrected distance data Rd given by Rd=[$\beta 2/\{((\alpha 2-\beta 2)\times A+\beta 2\}]\times D+(\alpha 2-\beta 2)\times B$ (where D is the distance data, $\alpha 2$ the reference capacitance, $\beta 2$ the correction capacitance, and A and B correction coefficients), when the difference between the correction capacitance and the reference capacitance is not less than the predetermined value.

In this case, when the difference between the correction capacitance and the reference capacitance is smaller than the predetermined value, the detecting means detects the distance to the object, based on the corrected distance data Rc without using the correction coefficients, while assuming that the distortion is small in the housing etc. of the distance measuring apparatus with change in temperature. On the other hand, when the difference between the correction capacitance and the reference capacitance is not less than the predetermined value, the detecting means detects the distance to the object, based on the corrected distance data Rd with also utilizing the correction coefficient A and correction coefficient B, while assuming that the distortion is large in the housing etc. of the distance measuring apparatus with change in temperature. Since the detecting means detects the distance to the object with use of the proper corrected distance data according to the degree of distortion of the housing etc. as described, the ranging accuracy can be further improved.

In the distance measuring apparatus according to the present invention, the capacitance calculating means may calculate the correction capacitance before ranging in the ranging routine or may calculate the correction capacitance after ranging in the ranging routine.

Further, it is preferable that the capacitance calculating means calculate the capacitance of the integrating capacitor before and after ranging in the ranging routine and that the detecting means detect the distance to the object, using an average of the capacitance before the ranging and the capacitance after the ranging as the correction capacitance.

In this case, since the average of the capacitance before the ranging and the capacitance after the ranging is used as the correction capacitance, when compared with the case wherein the correction capacitance is calculated only either before the ranging or after the ranging, the distance is detected using the capacitance closer to the capacitance of the integrating capacitor in actual ranging, which can further improve the ranging accuracy.

(3) Still another distance measuring apparatus according to the present invention is an apparatus comprising light projecting means for projecting a beam toward an object to be measured; light receiving means for receiving reflected light of the beam projected toward the object, at a reception position according to a distance to the object and outputting a position signal according to the reception position; computing means for performing a predetermined operation based on the position signal outputted from the light receiving means to generate a distance computation value according to the distance to the object; integrating means comprising an integrating capacitor, the integrating means charging or discharging the integrating capacitor according to the distance computation value generated by the computing means to integrate the distance computation value; detecting means for detecting the distance to the object, based on distance data corresponding to the result of integral in the integrating means; charging means for charging the integrating capacitor to a predetermined voltage by letting a constant current flow; and charge time calculating means for calculating a time that elapses before a voltage of the integrating capacitor reaches the predetermined voltage, wherein the detecting means detects the distance to the object, based on a correction charge time being the charge time calculated by the charge time calculating means in a ranging routine, a reference charge time of the integrating capacitor preliminarily calculated before the ranging routine, and the distance data.

In the distance measuring apparatus according to the present invention, the charging means charges the integrating capacitor up to the predetermined voltage by letting the constant current flow in the ranging routine and the charge time calculating means calculates the correction charge time being the time that elapses before the integrating capacitor reaches the predetermined voltage. Then the detecting means calculates the distance to the object, based on (1) this correction charge time, (2) the reference charge time of the integrating capacitor preliminarily calculated before the ranging routine, e.g., immediately after manufacturing of the distance measuring apparatus, and (3) the distance data corresponding to the integral result in the integrating means. The time up to the predetermined voltage with flow of the constant current to the integrating capacitor is related to the capacitance of the capacitor. Namely, the ranging error due to the change in the capacitance of the integrating capacitor can be reduced, because the distance to the object is calculated, also considering the reference charge time, e.g., the charge time immediately after manufacturing and the correction charge in actual ranging, in addition to the distance data.

It is also preferable that the detecting means detect the distance to the object, based on corrected distance data Re given by Re=$(\alpha 3/\beta 3)\times D$ (where D is the distance data, $\alpha 3$ the reference charge time, and $\beta 3$ the correction charge time).

In this case, the ranging error due to the change in the capacitance of the integrating capacitor can be reduced, because the detecting means detects the distance to the object, based on the corrected distance data Re obtained by converting the distance data to that upon calculation of the reference charge time, e.g., upon manufacturing of the distance measuring apparatus.

In the distance measuring apparatus according to the present invention, it is also preferable that the detecting means detect the distance to the object, based on corrected distance data Rf given by Rf=[$\alpha 3/\{(\beta 3-\alpha 3)\times A+\alpha 3\}]\times D+(\beta 3-\alpha 3)\times B$ (where D is the distance data, $\alpha 3$ the reference charge time, $\beta 3$ the correction charge time, and A and B correction coefficients).

With distortion of the housing etc. of the distance measuring apparatus due to the change in ambient temperature, the optical system of the distance measuring apparatus will be distorted, which can increase the possibility of degrading the ranging accuracy. In such cases, it is difficult to improve the ranging accuracy by simply making use of the value of the ratio of the reference charge time to the correction charge time. It thus becomes feasible to improve the ranging accuracy by employing such a configuration that the correction coefficient A and the correction coefficient B of the distance measuring apparatus are preliminarily calculated and the detecting means detects the distance to the object, based on the above corrected distance data Rf.

Further, in the distance measuring apparatus according to the present invention, it is preferable that the detecting means detect the distance to the object, based on corrected distance data Re given by Re=($\alpha3/\beta3$)×D (where D is the distance data, $\alpha3$ the reference charge time, and $\beta3$ the correction charge time), when a difference between the correction charge time and the reference charge time is smaller than a predetermined value and that the detecting means detect the distance to the object, based on corrected distance data Rf given by Rf=[$\alpha3$/{($\beta3-\alpha3$)×A+$\alpha3$}]×D+ ($\beta3-\alpha3$)×B (where D is the distance data, $\alpha3$ the reference charge time, $\beta3$ the correction charge time, and A and B correction coefficients), when the difference between the correction charge time and the reference charge time is not less than the predetermined value.

In this case, when the difference between the correction charge time and the reference charge time is smaller than the predetermined value, the detecting means detects the distance to the object, based on the corrected distance data Re without using the correction coefficients, while assuming that the distortion is small in the housing etc. of the distance measuring apparatus with change in temperature. On the other hand, when the difference between the correction charge time and the reference charge time is not less than the predetermined value, the detecting means detects the distance to the object, based on the corrected distance data Rf with also utilizing the correction coefficient A and the correction coefficient B, while assuming that the distortion is large in the housing etc. of the distance measuring apparatus with change of temperature. Since the detecting means detects the distance to the object with use of the proper corrected distance data according to the degree of distortion of the housing etc. as described, the ranging accuracy can be further improved.

In the distance measuring apparatus according to the present invention, the charge time calculating means may calculate the correction charge time before ranging in the ranging routine or may calculate the correction charge time after ranging in the ranging routine.

Further, it is preferable that the charge time calculating means calculate the charge time of the integrating capacitor before and after ranging in the ranging routine and that the detecting means detect the distance to the object, using an average of the charge time before the ranging and the charge time after the ranging as the correction charge time.

In this case, since the average of the charge time before the ranging and the charge time after the ranging is used as the correction charge time, when compared with the case wherein the correction charge time is calculated only either before the ranging or after the ranging, the distance is detected using the charge time corresponding to a capacitance closer to the capacitance of the integrating capacitor in actual ranging, which can further improve the ranging accuracy.

Further, in the distance measuring apparatus of above (1) and (2), it is preferable that the integrating means integrate the distance computation value, based on a predetermined timing signal, and that the charging means charge the integrating capacitor at the timing equal to the timing signal.

When this configuration is employed, the correction voltage or the correction capacitance is calculated under circumstances closer to those during actual ranging, which can thus further improve the ranging accuracy.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10 is a timing chart to show the operation of the distance measuring apparatus in the fourteenth embodiment.

DESCRIPTION OF THE PREFERRED EMBODIMENTS

The preferred embodiments of the distance measuring apparatus according to the present invention will be described below in detail with reference to the accompanying drawings. The same elements will be denoted by the same reference symbols and redundant description will be omitted.

First Embodiment

Figure 1:
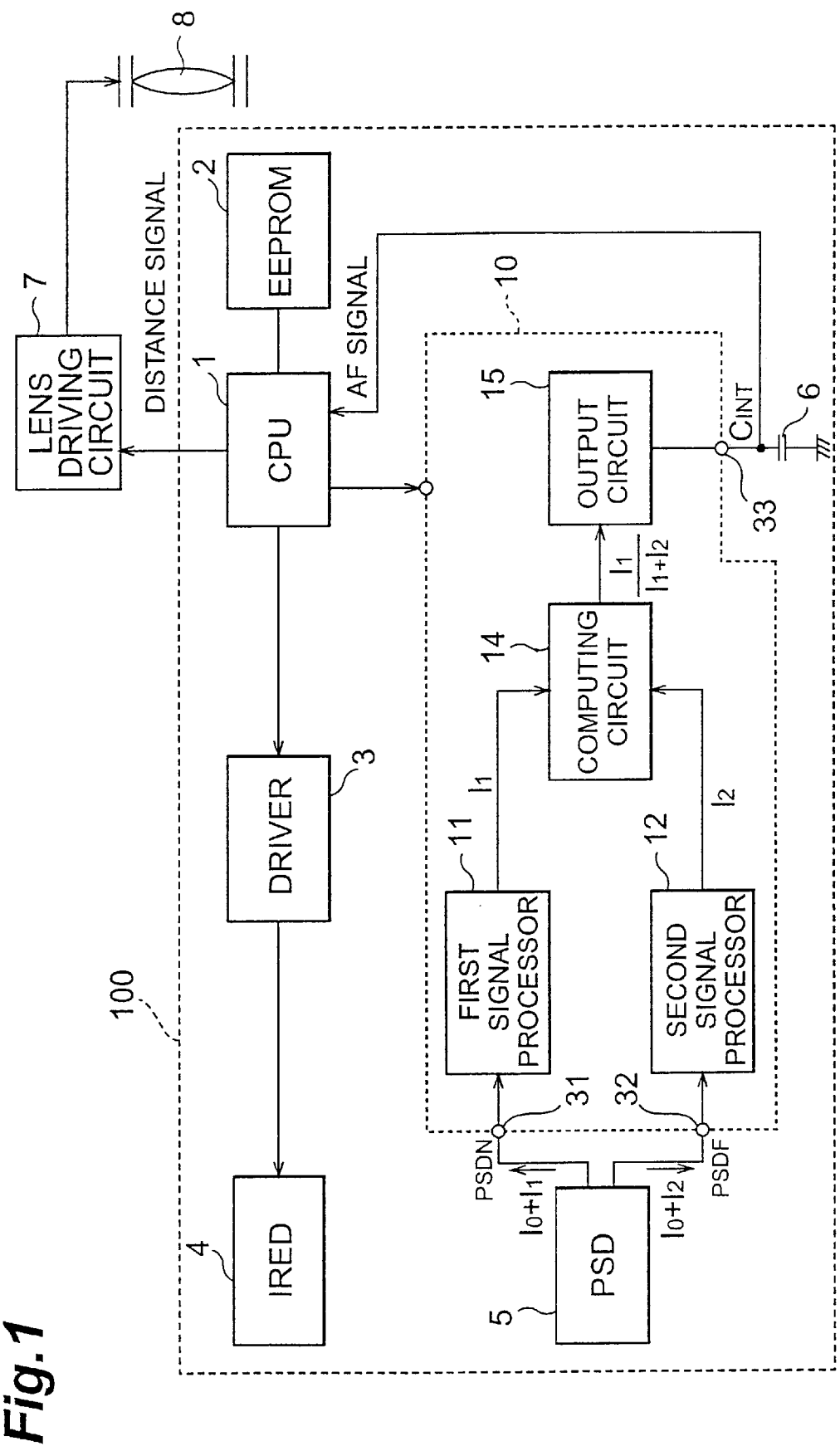
FIG. 1 is a block diagram to show the distance measuring apparatus of the first embodiment of the present invention.

FIG. 1 is a block diagram to show the distance measuring apparatus 100 of the present embodiment. A CPU 1 is a unit for controlling the entire camera in which this distance measuring apparatus 100 is mounted and for controlling the entire camera including this distance measuring apparatus 100, based on programs and parameters preliminarily stored in an EEPROM 2. In this distance measuring apparatus 100, the CPU 1 controls a driver 3 to control emission of infrared light from an IRED (infrared emitting diode) 4. The CPU 1 also controls the operation of auto focusing IC (hereinafter referred to as "AFIC") 10 and receives an AF signal (distance data) from the AFIC 10.

The infrared light emitted from the IRED 4 is projected through a projection lens (not illustrated) placed in front of the IRED 4, toward an object to be measured, and is reflected in part. The reflected light travels through a receiving lens (not illustrated) placed in front of a PSD (position sensitive detector) 5 to be received somewhere on a photo receptive surface of the PSD 5. This reception position is a position according to the distance to the object.

The PSD 5 outputs two signals $I_1$ and $I_2$ according to the reception position. The signal $I_1$ is a near signal, which increases with decrease in the distance to the object if the quantity of received light is constant. The signal $I_2$ is a far signal, which increases with increase in the distance to the object if the quantity of received light is constant. The sum of the signal $I_1$ and the signal $I_2$ represents the quantity of reflected light received by the PSD 5. The near signal $I_1$ is supplied to a PSDN terminal 31 of the AFIC 10 and the far signal $I_2$ to a PSDF terminal 32 of the AFIC 10. It is, however, noted that the AFIC 10 actually receives signals resulting from addition of a stationary light component $I_0$ to the near signal $I_1$ and to the far signal $I_2$ according to the outside conditions.

The AFIC 10 is an integrated circuit (IC) and is comprised of a first signal processing circuit 11, a second signal processing circuit 12, a computing circuit 14, and an output circuit 15. The first signal processing circuit 11 accepts input of the signal $I_1+I_0$ from the PSD 5, eliminates the stationary light component $I_0$ from the signal, and outputs the near signal $I_1$. The second signal processing circuit 12 also accepts input of the signal $I_2+I_0$ from the PSD 5, eliminates the stationary light component $I_0$ from the signal, and outputs the far signal $I_2$.

The computing circuit 14 accepts input of the near signal $I_1$ from the first signal processing circuit 11 and the far signal $I_2$ from the second signal processing circuit 12, calculates an output ratio $(I_1/(I_1+I_2))$, and outputs an output ratio signal (distance computation value) indicating the result of computation. This output ratio $(I_1/(I_1+I_2))$ represents the reception position on the photo receptive surface of the PSD 5, i.e., the distance to the object.

The output circuit 15 accepts input of this output ratio signal (distance computation value) and accumulates multiple output ratios in cooperation with an integrating capacitor 6 connected to a $C_{INT}$ terminal 33 of the AFIC 10, thereby improving S/N ratios. Then the CPU 1 receives the thus accumulated output ratio as an AF signal (distance data). Receiving the AF signal from the AFIC 10, the CPU 1 performs a predetermined operation to transform the AF signal to a distance signal and sends the distance signal to a lens driving circuit 7. The lens driving circuit 7 performs the focusing operation of taking lens 8, based on the distance signal.

The first signal processing circuit 11 and output circuit 15 of the AFIC 10 will be described below in further detail with reference to FIG. 2.

Figure 2:
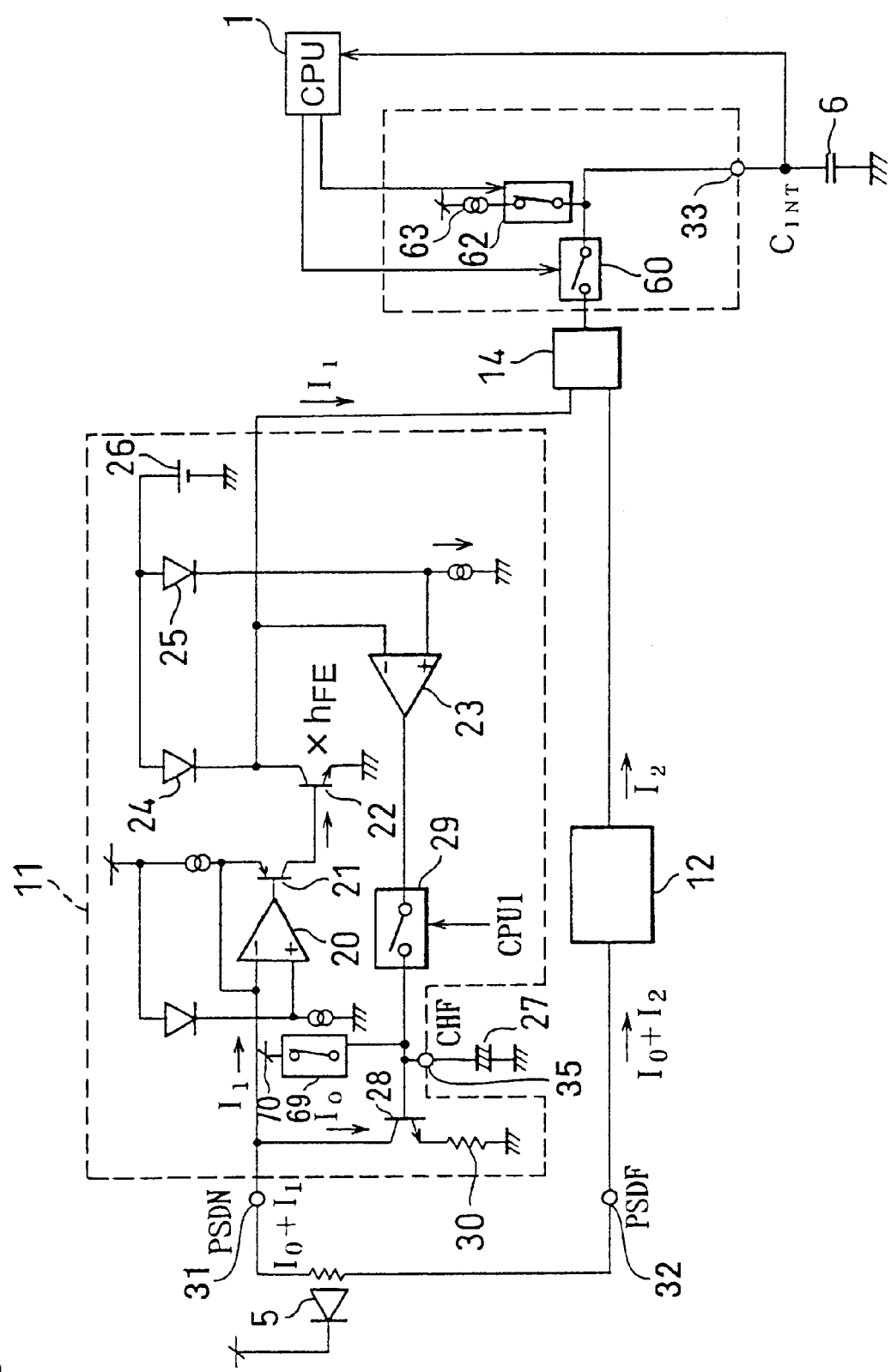
FIG. 2 is a circuit diagram of a first signal processing circuit and an output circuit in the distance measuring apparatus illustrated in FIG. 1.

FIG. 2 is a circuit diagram of the first signal processing circuit 11 and output circuit 15. The configuration of the second signal processing circuit 12 is also similar to that of the first signal processing circuit 11. As described above, the first signal processing circuit 11 is a circuit receiving the near signal $I_1$ plus the stationary light component $I_0$ from the PSD 5, eliminating the stationary light component $I_0$ from the signal, and outputting the near signal $I_1$. Namely, the near range terminal of the PSD 5 is connected through the PSDN terminal 31 of the AFIC 10 to the negative input terminal of operational amplifier 20 of the first signal processing circuit 11.

The output terminal of the operational amplifier 20 is connected to the base terminal of transistor 21 and the collector terminal of the transistor 21 is connected to the base terminal of transistor 22. The collector terminal of the transistor 22 is connected to the negative input terminal of operational amplifier 23 and also connected to the computing circuit 14. Further, the cathode terminal of compressing diode 24 is connected to the collector terminal of the transistor 22 and the cathode terminal of compressing diode 25 is connected to the positive input terminal of the operational amplifier 23. A power supply 26 is connected to the anode terminals of these respective compressing diodes 24 and 25.

A stationary light eliminating capacitor 27 is externally connected to a CHF terminal 35 of the AFIC 10 and this stationary light eliminating capacitor 27 is connected to the base terminal of stationary light eliminating transistor 28 in the first signal processing circuit 11. The stationary light eliminating capacitor 27 and the operational amplifier 23 are connected through a switch 29 to each other and the CPU 1 controls on/off of this switch 29. The collector terminal of the stationary light eliminating transistor 28 is connected to the negative input terminal of the operational amplifier 20 and the emitter terminal of the transistor 28 is grounded through a resistor 30.

The output circuit 15 has the following configuration. The integrating capacitor 6 externally connected to the $C_{INT}$ terminal 33 of the AFIC 10 is connected through a switch 60 to the output terminal of the computing circuit 14, is connected through a switch 62 to a constant current source 63, and is grounded through switch 64. The potential of the integrating capacitor 6 is read out by the CPU 1 as described above. The switch 60, switch 62, and switch 64 are controlled by a control signal from the CPU 1.

Next, the action of this AFIC 10 will be schematically described referring to FIG. 1 and FIG. 2.

The CPU 1 keeps the switch 29 of the first signal processing circuit 11 on while the IRED 4 emits no light. The stationary light component $I_0$ outputted from the PSD 5 during this period is supplied to the first signal processing circuit 11, is subjected to current amplification in a current amplifier consisting of the operational amplifier 20, transistor 21, and transistor 22, and is converted into a voltage signal by logarithmic compression in the compressing diode 24. This voltage signal is supplied to the negative input terminal of the operational amplifier 23. When the signal entered into the operational amplifier 20 is large, the cathode potential of the compressing diode 24 becomes large and thus the signal from the operational amplifier 23 becomes large to charge the stationary light eliminating capacitor 27. Then the base current is supplied to the transistor 28, so that the collector current flows in the transistor 28, so as to decrease the signal entered into the operational amplifier 20 out of the signal $I_0$ supplied to the first signal processing circuit 11. After the operation of this closed loop becomes stable, all the signal $I_0$ supplied to the first signal processing circuit 11 flows to the transistor 28 and a charge corresponding to the base current at that time is stored in the stationary light eliminating capacitor 27.

When the CPU 1 switches the switch 29 off in synchronism with light emission of the IRED 4, the stationary light component $I_0$ in the signal $I_1+I_0$ from the PSD 5 at this time flows as a collector current to the transistor 28 to which the base potential is applied because of the charge stored in the stationary light eliminating capacitor 27. The near signal $I_1$ is current-amplified by the current amplifier consisting of the operational amplifier 20 and the transistors 21 and 22, and is converted in to the voltage signal by logarithmic compression in the compressing diode 24 to be outputted. Namely, the first signal processing circuit 11 eliminates the stationary light component $I_0$ and outputs only the near signal $I_1$, and the near signal $I_1$ is supplied to the computing circuit 14. on the other hand, the second signal processing circuit 12 also eliminates the stationary light component $I_0$ and outputs only the far signal $I_2$ as the first signal processing circuit 11 does. The far signal $I_2$ is supplied to the computing circuit 14.

The near signal $I_1$ outputted from the first signal processing circuit 11 and the far signal $I_2$ outputted from the second signal processing circuit 12 are entered into the computing circuit 14, and the computing circuit 14 calculates the output ratio ($I_1/(I_1+I_2)$) and outputs it. The output ratio is supplied to the output circuit 15. During emission of a predetermined number of pulses from the IRED 4, the switch 60 of the output circuit 16 is on and the switch 62 and switch 64 are off. Then the output ratio signal (distance computation value) from the computing circuit 14 is stored in the integrating capacitor 6, so as to perform the integral operation of the output ratio signal. Namely, the integrating means is composed of the output circuit 15, integrating capacitor 6, and CPU 1 in the present embodiment.

The voltage of the integrating capacitor 6 at this time, i.e., the integral result is read out as an AF signal (distance data) by the CPU as described above. Receiving the AF signal from the AFIC 10, the CPU 1 detects the distance to the object, based on this AF signal and information etc. stored in the EEPROM 2. Namely, the CPU 1 also functions as the detecting means for detecting the distance to the object in the present embodiment. A feature of the distance measuring apparatus of the present embodiment is this distance detection process and this point will be described in the following description of the operation.

The operation of the distance measuring apparatus of the present embodiment will be described referring to FIG. 1 to FIG. 3.

Figure 3:
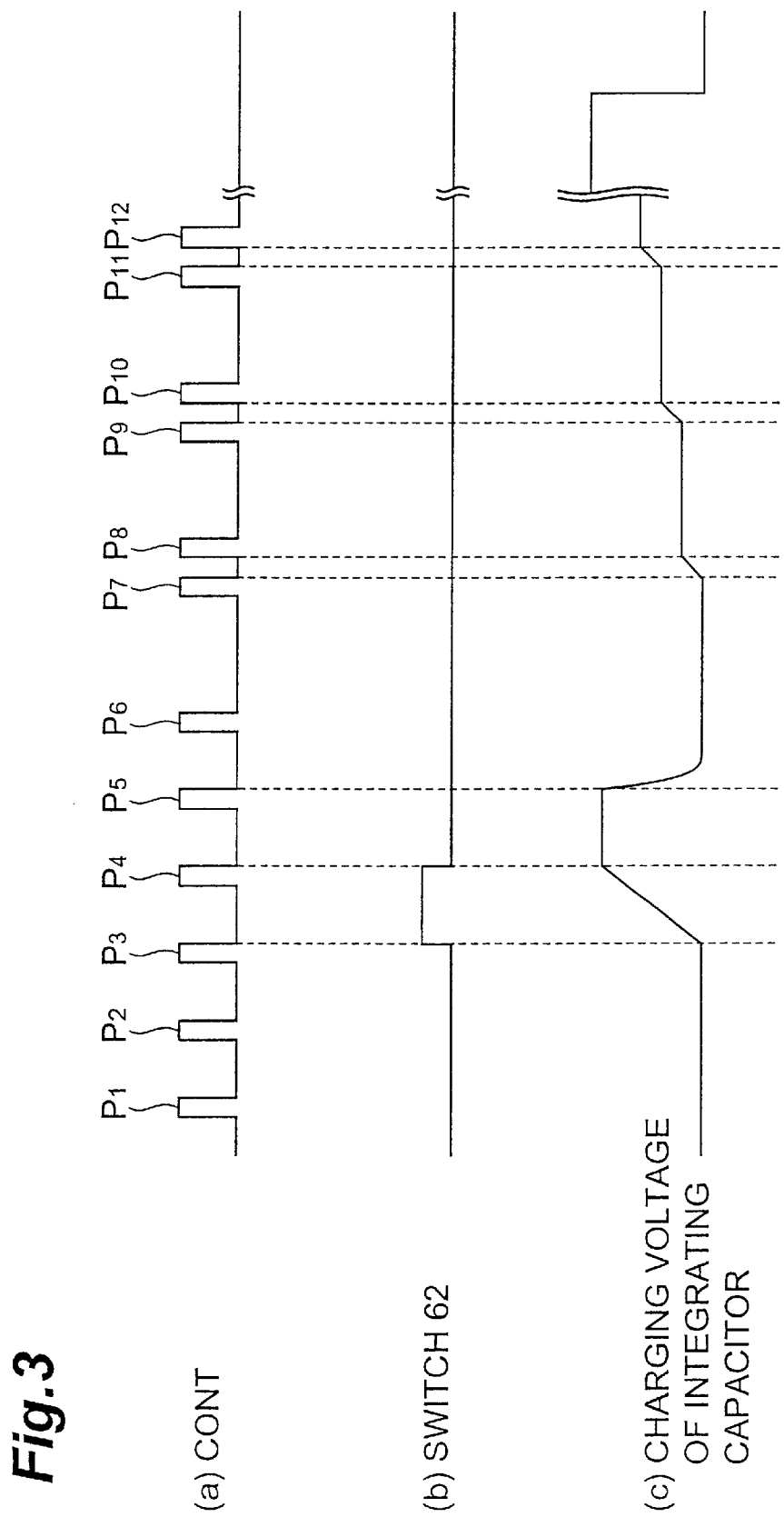
FIG. 3 is a timing chart to show the operation of the distance measuring apparatus in the first embodiment and in the ninth embodiment.

In the timing chart of FIG. 3, FIG. 3(a) shows the control signal from the CPU 1, FIG. 3(b) the operation of the switch 62, and FIG. 3(c) the charge voltage of the integrating capacitor 6.

When the release button of the camera is depressed by a half stroke to go into a ranging routine, the CPU 1 outputs the control signal, as illustrated in FIG. 3(a), to the AFIC 10. Then the switch 62 in the output circuit 15 is switched on at the timing of the fall of pulse P3, as illustrated in FIG. 3(b). This causes the integrating capacitor 6 to be charged at a constant speed determined by the rating of the constant current source 63 in the output circuit 15, as illustrated in FIG. 3(c). Namely, the CPU 1 and output circuit 15 compose the charging means. Then the switch 62 is turned off at the timing of the fall of pulse P4 to terminate the charging of the integrating capacitor 6. After that, the CPU 1, as the voltage calculating means, calculates the voltage of the integrating capacitor 6 before the timing of the fall of pulse P5. The voltage of the integrating capacitor 6 on this occasion will be referred to hereinafter as a correction voltage. The CPU 1 turns the switch 64 on at the timing of the fall of pulse P5 to discharge the integrating capacitor 6 to the potential of the ground. In the present embodiment, as illustrated in FIG. 3(a) to FIG. 3(c), the charging of the integrating capacitor 6 for the calculation of the correction voltage is carried out before the ranging operation (or during the pulses P1 to P6) in the ranging routine, i.e., before the integration of distance computation value described hereinafter.

A reference voltage of the integrating capacitor 6 is preliminarily stored in the EEPROM 2 (see FIG. 1). This reference voltage is a voltage measured when the integrating capacitor 6 was charged by the constant current source 63 for the same time as the period between the fall of the pulse P3 and the fall of the pulse P4 illustrated in FIG. 3(a), before the ranging routine, e.g., immediately after manufacturing of the distance measuring apparatus 100. The capacitance of the integrating capacitor 6 can vary because of influence of ambient temperature or the like, but the reference voltage is the voltage measured before the change of the capacitance of the integrating capacitor 6.

After the calculation of the correction voltage as described above, the driver 3 is actuated by a signal from the CPU 1, whereby the IRED 4 emits pulses of infrared light. The infrared light emitted from the IRED 4 is reflected by the object and thereafter is received by the PSD 5. On the other hand, at the same time as the emission from the IRED 4, the switch 29 (see FIG. 2) of the first signal processing circuit 11 is turned off to enter the near signal $I_1$, without the stationary light component $I_0$ into the computing circuit 14. Similarly, the second signal processing circuit 12 supplies the far signal $I_2$ without the stationary light component $I_0$ to the computing circuit 14. The computing circuit 14 outputs data (distance computation value) of the output ratio $I_1/(I_1+I_2)$, based on the near signal $I_1$ and the far signal $I_2$.

Then, during the period between the fall of the pulse P7 and the rise of the pulse P8 illustrated in FIG. 3(a), the switch 60 of the output circuit 15 is kept on, whereby a positive voltage corresponding to the output ratio from the computing circuit 14 is entered into the integrating capacitor 6. The IRED 4 is turned off at the timing of the rise of the pulse P8. After a lapse of a signal error time, the switch 29 of the first signal processing circuit 11 is turned on to start accumulation of the stationary light component $I_O$ of the output signal from the PSD 5 into the stationary light eliminating capacitor 27.

The integrating capacitor 6 of the output circuit 15 accepts the output ratio from the computing circuit 14, i.e., the distance computation value to be charged by a voltage according to the level of the distance computation value. According to this operation, the voltage of the integrating capacitor 6 increases stepwise with input of the distance computation value every emission of the IRED 4, as illustrated in FIG. 3(c). An amount of voltage increase of each step itself is distance information corresponding to the distance to the object, but the distance information in the present embodiment is the sum of voltage increase amounts resulting from the emission of pulses from the IRED 4.

After completion of input of distance computation values in the predetermined emission number into the integrating capacitor 6, the CPU 1 reads the integral result of distance computation values by the integrating capacitor 6, as an AF signal (distance data). The CPU 1 also reads the reference voltage of the integrating capacitor 6 preliminarily stored in the EEPROM 2.

Then the CPU 1 detects the distance to the object, based on a corrected AF signal (corrected distance data) Ra given by Eq. (1) below.

$$Ra = (\alpha 1/\beta 1) \times D \qquad \text{Eq. (1)}$$

(where D is the AF signal (distance data), α1 the reference voltage, and β1 the correction voltage.)

The voltage of the integrating capacitor 6 after flow of a constant current for a fixed time is associated with the capacitance of the integrating capacitor 6. Therefore, the distance measuring apparatus 100 of the present embodiment is constructed to detect the distance to the object, based on the corrected AF signal Ra obtained by converting the AF signal to that upon calculation of the reference voltage, e.g., upon manufacturing of the distance measuring apparatus, as seen from above Eq. (1). This can reduce the ranging error due to the change in the capacitance of the integrating capacitor 6.

When the release button is fully depressed thereafter, the CPU 1 controls the lens driving circuit 7, based on the distance thus obtained, to perform appropriate focusing operation of the taking lens 8, and opens the shutter (not illustrated) to effect exposure. The sequential photographing operations of calculation of the correction voltage, ranging, focusing, and exposure are carried out as described above in conjunction with manipulation on the release button.

Second Embodiment

Next, the second embodiment of the distance measuring apparatus according to the present invention will be described below. The present embodiment is different in the detection process of distance in the CPU 1 from the first embodiment.

The various members and housing (mechanical parts) constituting the distance measuring apparatus 100 can undergo distortion with change in ambient temperature. With the distortion of the housing etc., the optical system of the distance measuring apparatus 100 will be distorted, which can be the cause of degradation of ranging accuracy. In such cases, the ranging accuracy is hardly improved by simply making use of the value of the ratio of the reference voltage to the correction voltage as in the first embodiment.

Figure 4:
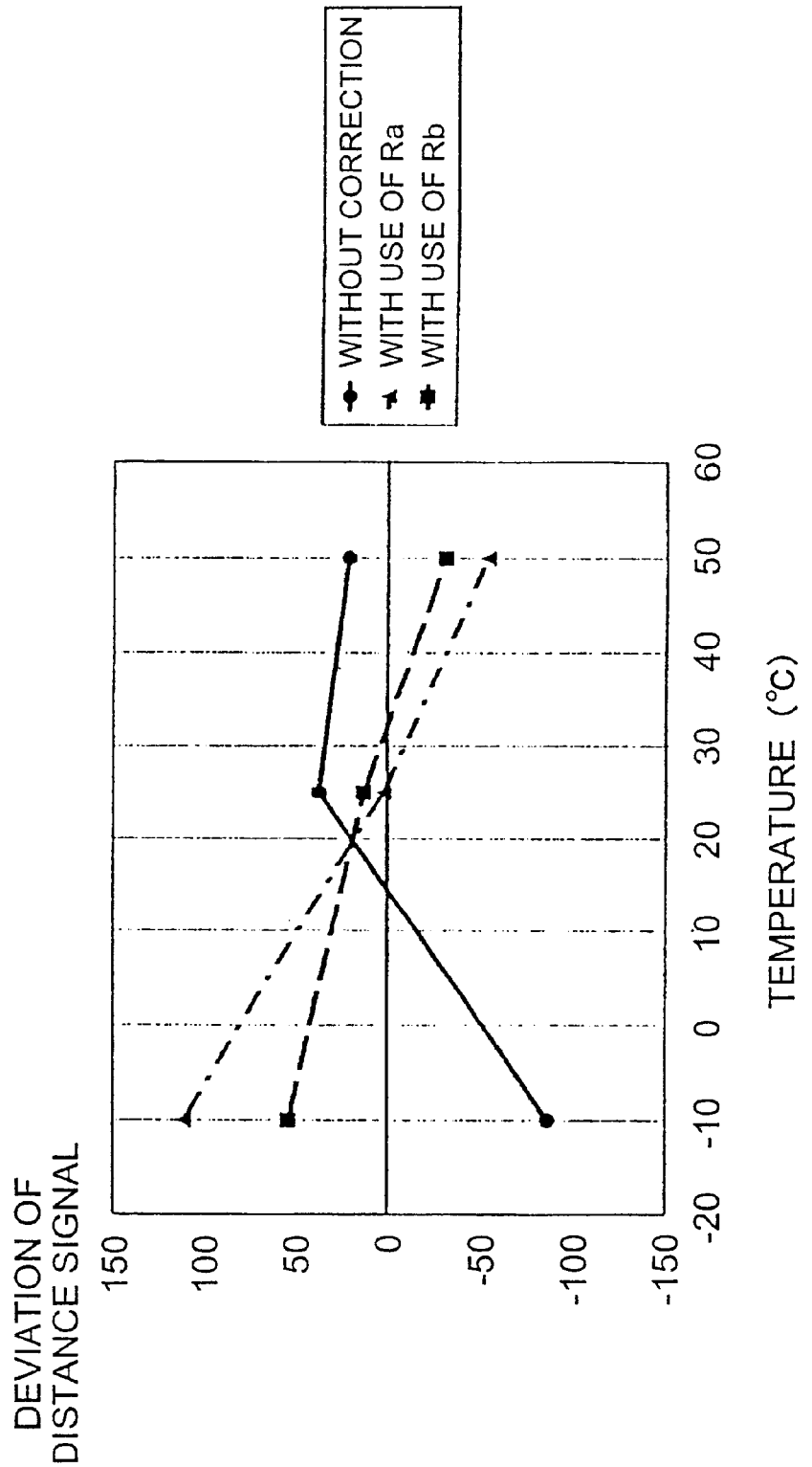
FIG. 4 is a graph to show the relationship between ambient temperature of the distance measuring apparatus and deviation of the distance signal.

FIG. 4 is a graph to show the relation between ambient temperature of the distance measuring apparatus 100 and deviation of the distance signal. In the figure, circular dots indicate the results where the distance to the object was calculated based on the AF signal without calculation of the corrected AF signal, triangular dots the results where the distance was calculated based on the corrected AF signal Ra obtained by Eq. (1) of the first embodiment, and square dots the results where the distance was calculated by the present embodiment. As seen from the same figure, if the distance is calculated by the method of the first embodiment without consideration to the distortion of the housing etc., there can occur such an event that the ranging error is not reduced while there is little change in the absolute value of deviation of the distance signal with an opposite sign; e.g., as in the case of the ambient temperature of −10° C.

In the present embodiment, the CPU 1 detects the distance to the object, based on a corrected AF signal (corrected distance data) Rb given by Eq. (2) below accordingly.

$$Rb=[\alpha1/\{(\beta1-\alpha1)\times A+\alpha1\}]\times D+(\beta1-\alpha1)\times B \quad \text{Eq. (2)}$$

(where D is the AF signal (distance data), α1 the reference voltage, β1 the correction voltage, and A and B correction coefficients.)

The correction coefficients A, B are values inherent in each distance measuring apparatus and proper values thereof are preliminarily determined by experiment upon manufacturing of the distance measuring apparatus. An example of how to determine the correction coefficients A, B will be described below. When the reference voltage α1 (A/D value) is the count of 600 and the correction voltage β1 the count of 500, the corrected AF signal Ra at ordinary temperature can be determined by Ra=600/500×D according to above Eq. (1). Now let us suppose that there occurred the distortion of the housing due to influence of temperature and it was verified by experiment that better distance data was obtained with the count of 550 than with the count of 600 for the reference voltage α1. In this case, the correction coefficient A can be determined by equating Eq. (1) with α1 of 550 and β1 of 500 to Eq. (2) with α1 of 600 and β1 of 500, as presented below. Here the correction coefficient B is assumed to be zero.

$$550/500=[600/\{(500-600)\times A+600\}]$$

From the above equation, A=0.545454 is determined. Then this is substituted into Eq. (2) to obtain the corrected AF signal by Rb=[600/{(500−600)×0.545454+600}]×D. The correction coefficients A, B are preliminarily stored in the EEPROM 2. FIG. 4 shows the results where the correction coefficient A is 0.7 and the correction coefficient B is 0. As described above, the distance measuring apparatus of the present embodiment can also reduce the ranging error due to the distortion of the housing etc. of the distance measuring apparatus by adjusting the values of the correction coefficients A, B and thus improve the ranging accuracy.

Third Embodiment

Next, the third embodiment of the distance measuring apparatus according to the present invention will be described. The present embodiment is different in the detection process of distance in the CPU 1 from the first embodiment and the second embodiment. As shown in FIG. 4, the ranging error is larger around the ordinary temperature (25° C.) when the distance is detected based on the corrected AF signal (corrected distance data) Rb using the correction coefficients A, B than when the distance is detected based on the corrected AF signal Ra not using the correction coefficients A, B. This is because the distance to the object was detected based on Eq. (2) involving the premise of existence of distortion of the housing etc., though there was little distortion in the housing etc. of the distance measuring apparatus due to change in temperature.

In the present embodiment, therefore, the CPU 1 detects the distance to the object, based on the corrected AF signal Ra determined by above Eq. (1), when the difference between the correction voltage and the reference voltage is smaller than a predetermined value, but the CPU detects the distance to the object, based on the corrected AF signal Rb determined by above Eq. (2), when the difference between the correction voltage and the reference voltage is not less than the predetermined value.

Namely, when the difference between the correction voltage and the reference voltage is smaller than the predetermined value, the CPU 1 detects the distance to the object, based on the corrected AF signal Ra without use of the correction coefficients, while assuming that the distortion is small in the housing etc. with change of temperature. On the other hand, when the difference between the correction voltage and the reference voltage is not less than the predetermined value, the CPU 1 detects the distance to the object, based on the corrected AF signal Rb, with also utilizing the correction coefficient A and correction coefficient B, while assuming that the distortion is large in the housing etc. with change of temperature. In this way the present embodiment can further improve the ranging accuracy, because the CPU 1 detects the distance to the object, using the appropriate corrected AF signal according to the degree of distortion of the housing etc.

Fourth Embodiment

Figure 5:
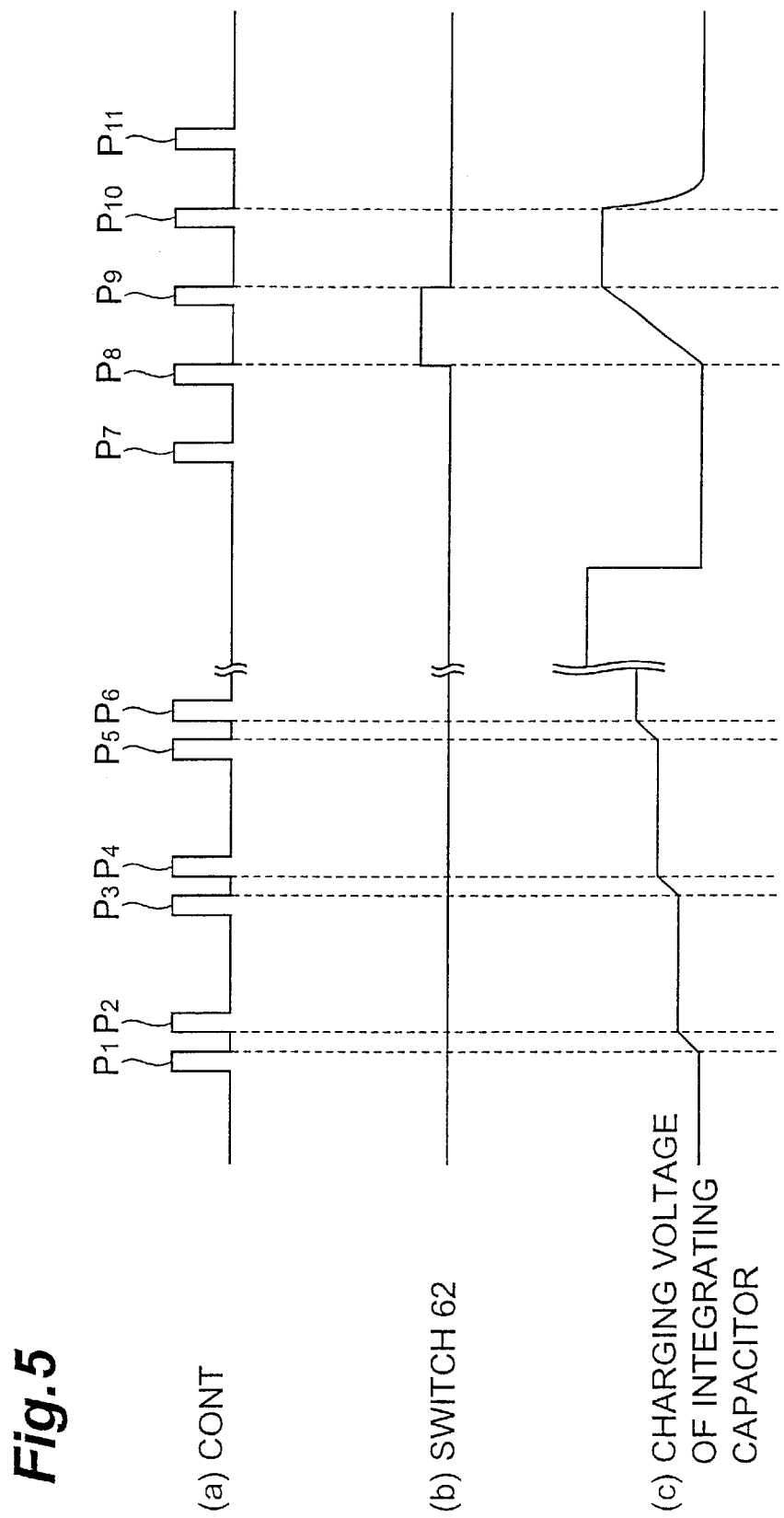
FIG. 5 is a timing chart to show the operation of the distance measuring apparatus in the fourth embodiment.

Next, the fourth embodiment of the distance measuring apparatus according to the present invention will be described referring to the timing chart of FIG. 5(a) to FIG. 5(c). The present embodiment is different in the time of calculation of the correction voltage from each of the above embodiments. As illustrated in FIG. 5(a) to FIG. 5(c), in the present embodiment the charging of the integrating capacitor 6 for the calculation of the correction voltage is not carried out before the ranging operation (the pulses P1 to P6) in the ranging routine, but is carried out after the ranging operation, i.e., after the integration of distance computation values.

Specifically, the switch 62 is turned on at the timing of the fall of the pulse P8, whereby the integrating capacitor 6 is charged at a fixed speed determined by the rating of the constant current source 63, as illustrated in FIG. 5(c). Then the switch 62 is turned off at the timing of the fall of the pulse P9 to terminate the charging of the integrating capacitor 6. After that, the CPU 1 calculates the correction voltage of the integrating capacitor 6 before the timing of the fall of the pulse P10. Then the CPU 1 detects the distance to the object, based on the correction voltage, the reference voltage, and the AF signal, as in each of the above embodiments.

Fifth Embodiment

Figure 6:
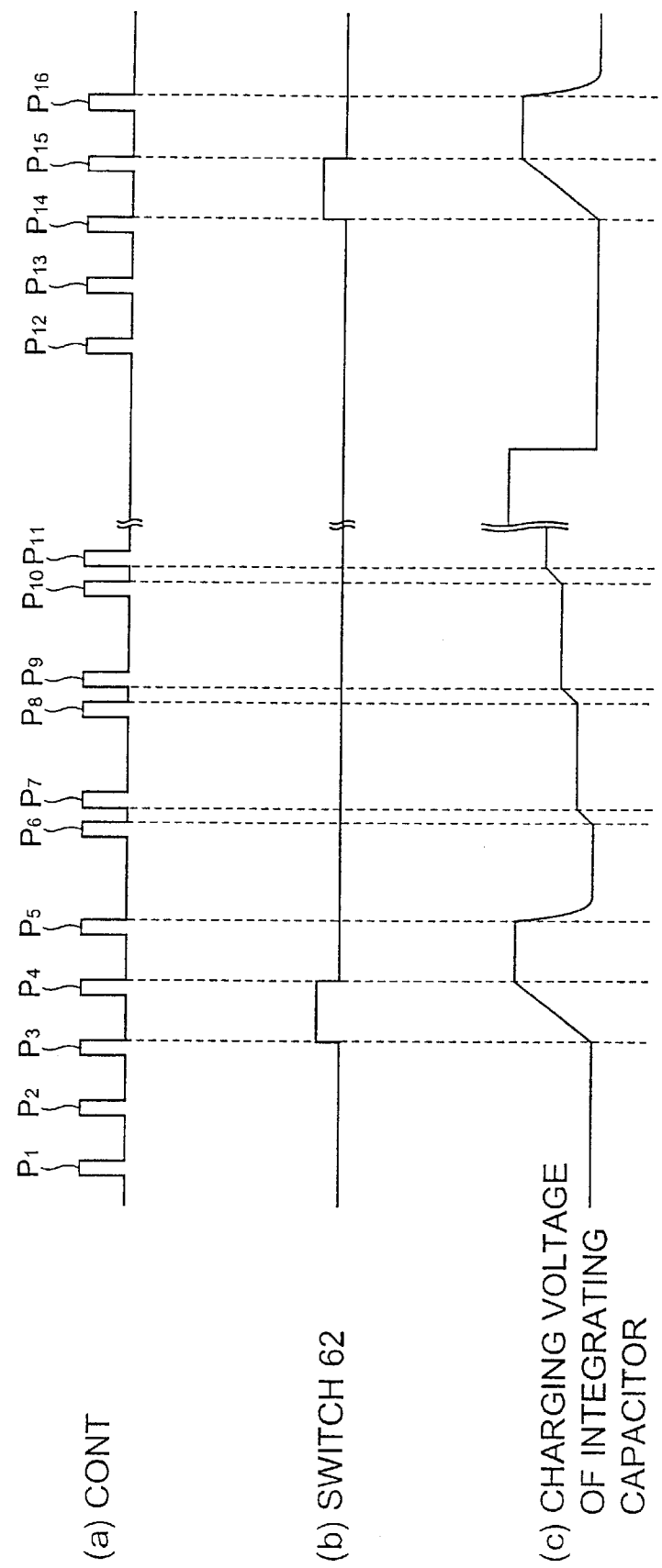
FIG. 6 is a timing chart to show the operation of the distance measuring apparatus in the fifth embodiment.

Next, the fifth embodiment of the distance measuring apparatus according to the present invention will be described referring to the timing chart of FIG. 6(a) to FIG. 6(c). The present embodiment is different in the time of calculation of the correction voltage from each of the above embodiments. As illustrated in FIG. 6(a) to FIG. 6(c), in the present embodiment the charging of the integrating capacitor 6 for the calculation of the correction voltage is carried out before the ranging operation (the pulses P6 to P11) and after the ranging operation in the ranging routine, i.e., before and after the integration of distance computation values.

Specifically, the switch 62 is turned on at the timing of the fall of the pulse P2, whereby the integrating capacitor 6 is charged at the fixed speed determined by the rating of the constant current source 63, as illustrated in FIG. 6(c). Then the switch 62 is turned off at the timing of the fall of the pulse P3 to terminate the charging of the integrated capacitor 6. After that, the CPU 1 calculates the voltage of the integrating capacitor 6 before the timing of the fall of the pulse P4. Then the ranging is carried out in synchronism with pulses P6 to P11 etc., then the integrating capacitor 6 is charged by the fixed current from the fall of pulse P13 to the fall of pulse P14, and the CPU 1 again calculates the voltage of the integrating capacitor 6. Then the CPU 1 calculates an average of the voltage before the ranging and the voltage after the ranging thus obtained, and uses the average as the correction voltage. Then the CPU 1 detects the distance to the object, based on the correction voltage obtained in this way, the reference voltage, and the AF signal.

The integrating capacitor 6 can change its capacitance before and after the ranging. Since the distance measuring apparatus of the present embodiment is constructed to use the average of the voltage before ranging and the voltage after ranging as the correction value as described above, the distance is detected using the voltage corresponding to the capacitance closer to the capacitance of the integrating capacitor 6 in the actual ranging, as compared with each of the above embodiments constructed to calculate the correction voltage only either before the ranging or after the ranging. Therefore, the present embodiment can further improve the ranging accuracy.

Sixth Embodiment

Next, the sixth embodiment of the distance measuring apparatus according to the present invention will be described referring to FIG. 1 and FIG. 3. The structure of the distance measuring apparatus of the present embodiment is similar to that of the first embodiment and the present embodiment is different in the way of detecting the distance by the CPU 1 of the detecting means, from the first embodiment. The details are as follows.

First, as in the first embodiment, the integrating capacitor 6 is charged by the constant current from the constant current source 63 during the period between the fall of the pulse P3 and the fall of the pulse P4, as illustrated in FIG. 3(a) to FIG. 3(c). After completion of the charging of the integrating capacitor 6, the CPU 1 then reads the voltage of the integrating capacitor 6 thus charged and the CPU 1 further calculates the capacitance of the integrating capacitor 6, based on this voltage and the charge accumulated in the integrating capacitor 6. This capacitance will be referred to hereinafter as a correction capacitance.

A reference capacitance of the integrating capacitor 6 is preliminarily stored in the EEPROM 2 (see FIG. 1). This reference capacitance is a capacitance measured when the integrating capacitor 6 is charged by the constant current source 63 for the same time as the period between the fall of pulse P3 and the fall of pulse P4 illustrated in FIG. 3(a), before the ranging routine, e.g., immediately after manufacturing of the distance measuring apparatus 100. The integrating capacitor 6 can change its capacitance because of the influence of the ambient temperature or the like, but the reference capacitance is the one measured before the capacitor is subjected to such influence.

After completion of the calculation of the correction capacitance, the ranging is carried out in synchronism with the pulses P7 to P12 and the like, as in the first embodiment. After completion of entry of output ratio signals ($I_1/(I_1+I_2)$) corresponding to the predetermined number of pulse emissions, into the integrating capacitor 6, i.e., after completion of entry of distance computation values, the CPU 1 then reads the integral result of distance computation values by the integrating capacitor 6 as the AF signal (distance data). The CPU 1 also reads the reference capacitance of the integrating capacitor 6 preliminarily stored in the EEPROM 2.

Then the CPU 1 detects the distance to the object, based on a corrected AF signal (corrected distance data) Rc determined by Eq. (3) below.

$$Rc=(\beta2/\alpha2)\times D \qquad \text{Eq. (3)}$$

(where D is the AF signal (distance data), α2 the reference capacitance, and β2 the correction capacitance.)

As seen from above Eq. (3), the distance measuring apparatus 100 is constructed to detect the distance to the object, based on the corrected AF signal Rc obtained by converting the AF signal to that upon the calculation of the reference capacitance, e.g., upon manufacturing of the distance measuring apparatus, and thus can reduce the ranging error due to change in the capacitance of the integrating capacitor 6. Since the capacitance of the capacitor is in the relation of inverse proportion to the voltage, Eq. (3) has the denominator of the reference capacitance α2 and the numerator of the correction capacitance β2, different from above Eq. (1).

The present embodiment is arranged to calculate the correction capacitance before the ranging operation in the ranging routine, i.e., before the integration of distance computation values, but the apparatus may also be modified to charge the integrating capacitor after the ranging operation, i.e., after the integration of distance computation values and then calculate the correction capacitance of the integrating capacitor 6, as in the fourth embodiment described above (see FIG. 5). Further, the apparatus may also be modified so as to charge the integrating capacitor 6 for calculation of the correction capacitance before the ranging operation (the pulses P6 to P11) and after the ranging operation in the ranging routine, i.e., before and after the integration of distance computation values, as in the fifth embodiment (see FIG. 6), and use the average of the capacitance before the ranging and the capacitance after the ranging thus obtained, as the correction capacitance. The integrating capacitor 6 can change its capacitance before and after the ranging. However, since the average of the capacitance before ranging and the capacitance after ranging is used as the correction capacitance, the distance is detected based on the capacitance closer to the capacitance of the integrating capacitor 6 in actual ranging, when compared with the case wherein the correction capacitance is calculated only either before the ranging or after the ranging. Therefore, the ranging accuracy can be further improved.

Seventh Embodiment

Next, the seventh embodiment of the distance measuring apparatus according to the present invention will be described. The present embodiment is different in the detection process of distance in the CPU 1 from the sixth embodiment.

The various members and housing constituting the distance measuring apparatus 100 can undergo distortion with change in ambient temperature. In this case, the ranging accuracy is hardly improved by simply making use of the value of the ratio of the reference capacitance to the correction capacitance as in the sixth embodiment. In the present embodiment, employing the technique similar to that in the second embodiment described above, the CPU 1 thus detects the distance to the object, based on a corrected AF signal (corrected distance data) Rd determined by Eq. (4) below.

$$Rd = [\beta 2 / \{(\alpha 2 - \beta 2) \times A + \beta 2\}] \times D + (\alpha 2 - \beta 2) \times B \quad \text{Eq. (4)}$$

(where D is the AF signal (distance data), $\alpha 2$ the reference capacitance, $\beta 2$ the correction capacitance, and A and B correction coefficients.)

The correction coefficients A, B are values inherent in each distance measuring apparatus and appropriate values thereof are preliminarily determined by experiment, for example, upon manufacturing of the distance measuring apparatus. The correction coefficients A, B are preliminarily stored in the EEPROM 2. As described above, the distance measuring apparatus of the present embodiment can also decrease the ranging error due to the distortion of the housing etc. of the distance measuring apparatus by adjusting the values of the correction coefficients A, B, thereby achieving the improvement in the ranging accuracy.

Eighth Embodiment

Next, the eighth embodiment of the distance measuring apparatus according to the present invention will be described. The present embodiment is different in the detection process of distance in the CPU 1 from the sixth embodiment and the seventh embodiment. In certain cases the ranging error is larger when the distance is detected based on the corrected AF signal Rd using the correction coefficients A, B than when the distance is detected based on the corrected AF signal Rc not using the correction coefficients A, B, as described in the third embodiment. This is because the distance to the object is detected based on above Eq. (4) involving the premise of existence of distortion of the housing etc. though there is little distortion in the housing etc. of the distance measuring apparatus with change of temperature.

In the present embodiment, therefore, the CPU 1 detects the distance to the object, based on the corrected AF signal Rc given by above Eq. (3), when the difference between the correction capacitance and the reference capacitance is smaller than a predetermined value, but the CPU detects the distance to the object, based on the corrected AF signal Rd given by above Eq. (4), when the difference between the correction capacitance and the reference capacitance is not less than the predetermined value.

Namely, when the difference between the correction capacitance and the reference capacitance is smaller than the predetermined value, the CPU 1 detects the distance to the object, based on the corrected AF signal Rc without use of the correction coefficients, while assuming that the distortion is small in the housing etc. with change of temperature. On the other hand, when the difference between the correction capacitance and the reference capacitance is not less than the predetermined value, the CPU 1 detects the distance to the object, based on the corrected AF signal Rd with also using the correction coefficient A and the correction coefficient B, while assuming that the distortion is large in the housing etc. with change of temperature. As described above, the present embodiment can further improve the ranging accuracy, because the CPU 1 detects the distance to the object, using the appropriate corrected AF signal according to the degree of distortion of the housing etc.

Ninth Embodiment

Next, the ninth embodiment of the distance measuring apparatus according to the present invention will be described referring to FIG. 1, FIG. 2, and FIG. 7. The structure of the distance measuring apparatus of the present embodiment is similar to that of the first embodiment and the present embodiment is different in the way of detection of distance by the CPU 1 of the detecting means, from the first embodiment. The details are as follows.

Figure 7:
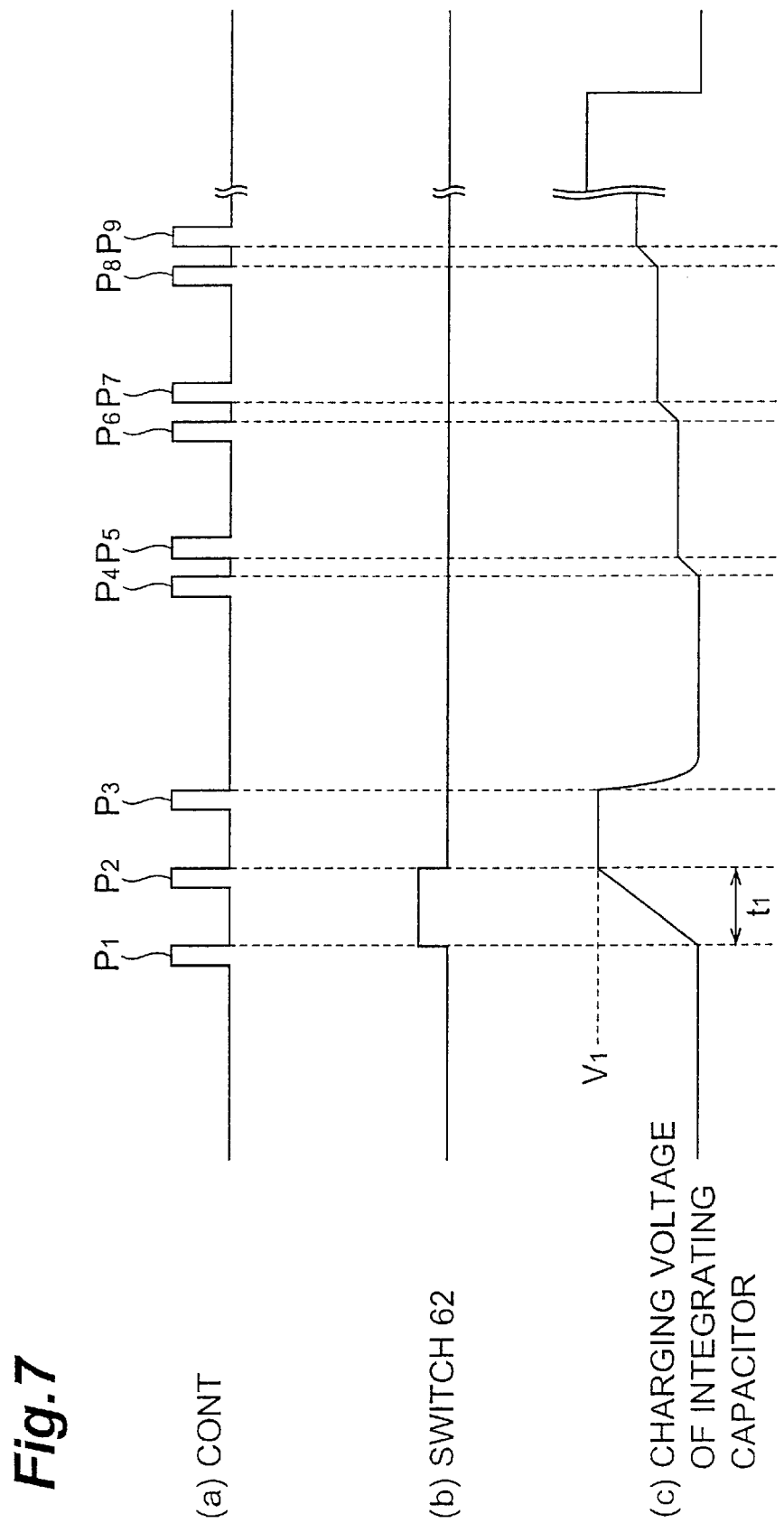
FIG. 7 is a timing chart to show the operation of the distance measuring apparatus in the ninth embodiment.

First, the switch 62 is turned on at the timing of the fall of the pulse P1 illustrated in FIG. 7(a). This causes the integrating capacitor 6 to be charged at the constant speed determined by the rating of the constant current source 63, as illustrated in FIG. 7 (c). Then the CPU 1 calculates a charge time t1 that elapses before the integrating capacitor 6 reaches a predetermined voltage V1. This charge time t1 will be referred to hereinafter as a correction charge time. After the integrating capacitor 6 reaches the predetermined voltage V1, the CPU 1 emits the pulse P2 to switch the switch 62 off, thereby terminating the charging of the integrating capacitor 6. Then the CPU 1 turns the switch 64 on at the timing of the fall of the pulse P3 to discharge the integrating capacitor 6, whereby the potential thereof becomes that of the ground.

A reference charge time of the integrating capacitor 6 is preliminarily stored in the EEPROM 2 (see FIG. 1). This reference charge time is a time necessary for the charging of the integrating capacitor 6 to the voltage V1 by the constant current source 63 before the ranging routine, e.g., immediately after manufacturing of the distance measuring apparatus 100. The integrating capacitor 6 can change its charge time because of the influence of ambient temperature or the like, but the reference charge time is the one measured before change of the capacitance of the integrating capacitor 6.

After completion of the calculation of the correction charge time, the ranging is carried out in synchronism with the pulses P4 to P9 and the like, as in the first embodiment. After output ratio signals ($I_1/(I_1+I_2)$) corresponding to a predetermined number of emissions, i.e., distance computation values have been entered into the integrating capacitor 6, the CPU 1 then reads the integral result of distance computation values by the integrating capacitor 6, as an AF signal (distance data). The CPU 1 also reads the reference charge time of the integrating capacitor 6 preliminarily stored in the EEPROM 2.

Then the CPU 1 detects the distance to the object, based on a corrected AF signal (corrected distance data) Re determined by Eq. (5) below.

$$Re = (\alpha 3/\beta 3) \times D \qquad \text{Eq. (5)}$$

(where D is the AF signal (distance data), $\alpha 3$ the reference charge time, and $\beta 3$ the correction charge time.)

As seen from above Eq. (5), the distance measuring apparatus of the present embodiment is constructed to detect the distance to the object, based on the corrected AF signal Re obtained by converting the AF signal to that upon calculation of the reference charge time, e.g., upon manufacturing of the distance measuring apparatus, and thus can reduce the ranging error due to change in the capacitance of the integrating capacitor 6.

Tenth Embodiment

Next, the tenth embodiment of the distance measuring apparatus according to the present invention will be described. The present embodiment is different in the detection process of distance in the CPU 1 from the ninth embodiment.

The various members and housing constituting the distance measuring apparatus 100 can undergo distortion with change in the ambient temperature. In such cases, it is difficult to improve the ranging accuracy by simply making use of the value of the ratio of the reference charge time to the correction charge time as in the ninth embodiment. In the present embodiment, employing the technique similar to those of the second embodiment and seventh embodiment described above, the CPU 1 thus detects the distance to the object, based on a corrected AF signal (corrected distance data) Rf determined by Eq. (6) below.

$$Rf = [\alpha 3/\{(\beta 3-\alpha 3) \times A + \alpha 3\}] \times D + (\beta 3-\alpha 3) \times B \qquad \text{Eq. (6)}$$

(where D is the AF signal (distance data), $\alpha 3$ the reference charge time, $\beta 3$ the correction charge time, and A and B correction coefficients.)

The correction coefficients A, B are values inherent in each distance measuring apparatus and appropriate values thereof are preliminarily determined by experiment, for example, upon manufacturing of the distance measuring apparatus. The correction coefficients A, B are preliminarily stored in the EEPROM 2. As described above, the distance measuring apparatus of the present embodiment can also reduce the ranging error due to the distortion of the housing etc. of the distance measuring apparatus by adjusting the values of the correction coefficients A, B and thus improve the ranging accuracy.

Eleventh Embodiment

Next, the eleventh embodiment of the distance measuring apparatus according to the present invention will be described. The present embodiment is different in the detection process of distance in the CPU 1 from the ninth embodiment and the tenth embodiment. In certain cases the ranging error is larger when the distance is detected based on the corrected AF signal Rf using the correction coefficients A, B than when the distance is detected based on the corrected AF signal Rd without use of the correction coefficients A, B, as described in the third embodiment. This is because the distance to the object is detected based on above Eq. (6) involving the premise of existence of distortion of the housing etc. though there is little distortion in the housing etc. of the distance measuring apparatus with change of temperature.

In the present embodiment, therefore, the CPU 1 detects the distance to the object, based on the corrected AF signal Re determined by above Eq. (5), when the difference between the correction charge time and the reference charge time is smaller than a predetermined value, but the CPU detects the distance to the object, based on the corrected AF signal Rf determined by above Eq. (6), when the difference between the correction charge time and the reference charge time is not less than the predetermined value.

Namely, when the difference between the correction charge time and the reference charge time is smaller than the predetermined value, the CPU 1 detects the distance to the object, based on the corrected AF signal Re without use of the correction coefficients, while assuming that the distortion is small in the housing etc. with change of temperature. On the other hand, when the difference between the correction charge time and the reference charge time is not less than the predetermined value, the CPU 1 detects the distance to the object, based on the corrected AF signal Rf with also using the correction coefficient A and correction coefficient B, while assuming that the distortion is large in the housing etc. with change of temperature. Since the CPU 1 detects the distance to the object, using the appropriate corrected AF signal according to the degree of distortion of the housing etc. as described above, the present embodiment can further improve the ranging accuracy.

Twelfth Embodiment

Figure 8:
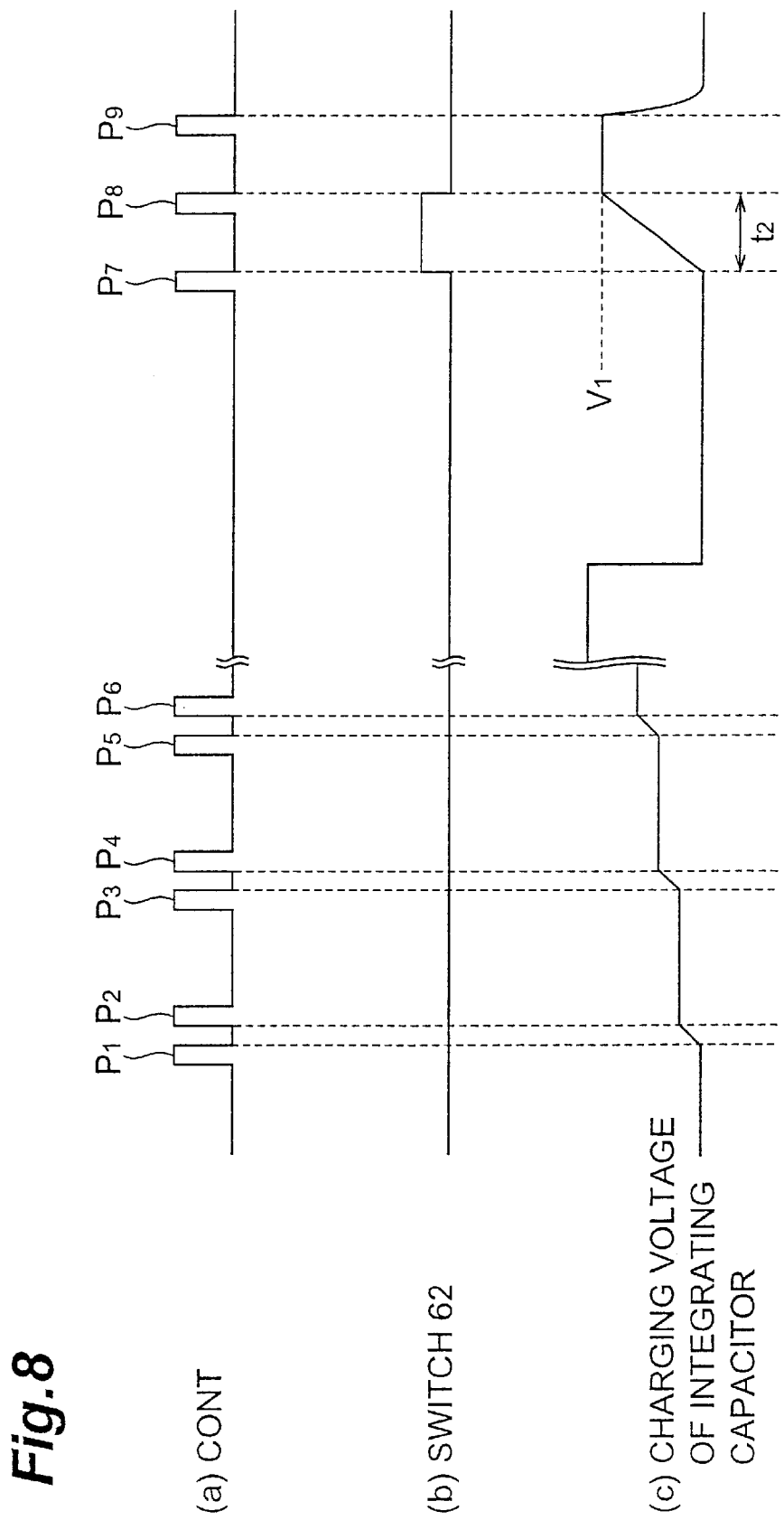
FIG. 8 is a timing chart to show the operation of the distance measuring apparatus in the twelfth embodiment.

Next, the twelfth embodiment of the distance measuring apparatus according to the present invention will be described referring to the timing chart of FIG. 8(a) to FIG. 8(c). The present embodiment is different in the timing of calculation of the correction charge time from the ninth to eleventh embodiments. As shown in FIG. 8(a) to FIG. 8(c), in the present embodiment the charging of the integrating capacitor 6 for the calculation of the correction charge time is not carried out before the ranging operation (the pulses P1 to P6) in the ranging routine, but is carried out after the ranging operation, i.e., after the integration of distance computation values.

Specifically, the switch 62 is turned on at the timing of the fall of the pulse P7, whereby the integrating capacitor 6 is charged at the constant speed determined by the rating of the constant current source 63, as illustrated in FIG. 8(c). Then the CPU 1 calculates the correction charge time t2 that elapses before the integrating capacitor 6 reaches the predetermined voltage V1. After the integrating capacitor 6 reaches the predetermined voltage V1, the CPU 1 emits the pulse P8 to switch the switch 62 off and terminate the charging of the integrating capacitor 6. After that, the CPU 1 detects the distance to the object, based on the correction charge time t2, the reference charge time, and the AF signal, as in the ninth to eleventh embodiments.

Thirteenth Embodiment

Figure 9:
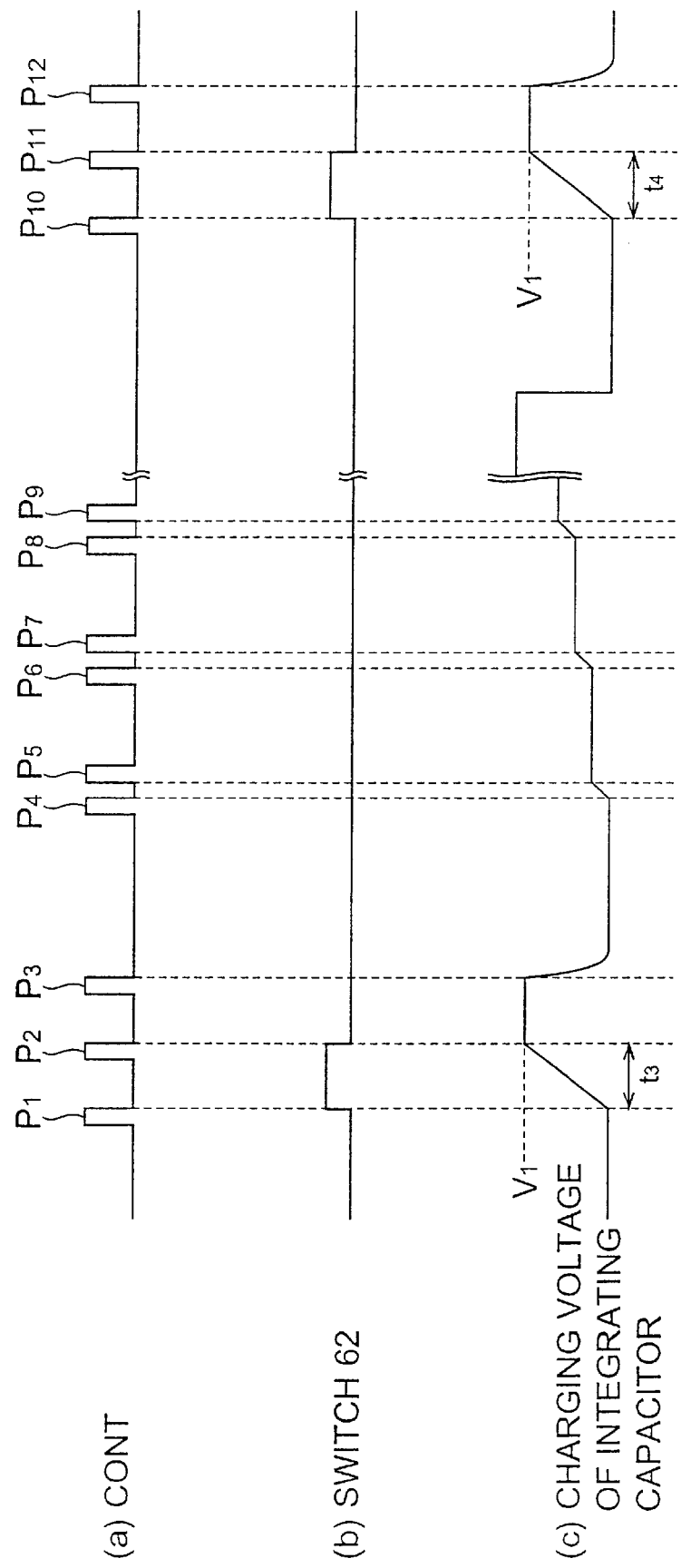
FIG. 9 is a timing chart to show the operation of the distance measuring apparatus in the thirteenth embodiment.

Next, the thirteenth embodiment of the distance measuring apparatus according to the present invention will be described referring to the timing chart of FIG. 9(a) to FIG. 9(c). The present embodiment is different in the timing of calculation of the correction charge time from the ninth to twelfth embodiments. As illustrated in FIG. 9(a) to FIG. 9(c), in the present embodiment the charging of the integrating capacitor 6 for the calculation of the correction charge time is carried out before the ranging operation (the pulses P4 to P9) and after the ranging operation in the ranging routine, i.e., before and after the integration of distance computation values.

Specifically, the switch 62 is turned on at the timing of the fall of the pulse P1, whereby the integrating capacitor 6 is charged at the constant speed determined by the rating of the constant current source 63, as illustrated in FIG. 9(c). Then the CPU 1 calculates the charge time t3 that elapses before the integrating capacitor 6 reaches the predetermined voltage V1. After the integrating capacitor 6 reaches the predetermined voltage V1, the CPU 1 emits the pulse P2 to switch the switch 62 off and terminate the charging of the integrating capacitor 6. Then the ranging is carried out in synchronism with the pulses P4 to P9 and the like, and thereafter the integrating capacitor 6 is again charged by the constant current from the fall of the pulse P10. The CPU 1 calculates the charge time t4 that elapses before the integrating capacitor 6 reaches the voltage V1.

Then the CPU 1 calculates an average of the charge time t3 before the ranging and the charge time t4 after the ranging obtained in this way and uses it as a correction charge time. Then the CPU 1 detects the distance to the object, based on the correction charge time obtained in this way, the reference charge time, and the AF signal.

The integrating capacitor 6 can change its capacitance before and after the ranging in certain cases. However, since the distance measuring apparatus of the present embodiment uses the average of the charge time t3 before ranging and the charge time t4 after ranging as the correction charge time, when compared with the above ninth to twelfth embodiments wherein the correction charge time is calculated only either before the ranging or after the ranging, the apparatus detects the distance, using the charge time corresponding to the capacitance closer to the capacitance of the integrating capacitor 6 in actual ranging, and thus can further improve the ranging accuracy.

Fourteenth Embodiment

Next, the fourteenth embodiment of the distance measuring apparatus according to the present invention will be described referring to FIG. 1, FIG. 2, and FIG. 10(a) to FIG. 10(c). The present embodiment is different in the way of charging of the integrating capacitor 6 for the calculation of the correction voltage from the first embodiment.

As illustrated in FIG. 10(a), the switch 62 is turned on to charge the integrating capacitor 6 by the constant current source 63 during the period from the fall of the pulse P1 to the rise of the pulse P2, during the period from the fall of the pulse P3 to the rise of the pulse P4, and during the period from the fall of the pulse P5 to the rise of the pulse P6. Then the charging of the integrating capacitor is terminated when the total charge time by the constant current source 63 reaches a predetermined time. After completion of the charging of the integrating capacitor 6, the CPU 1 calculates the correction voltage, which was described in the first embodiment. Then the ranging is carried out in synchronism with the pulses P7 to P12 and the like.

In the present embodiment the spacing ta between the pulses P1 and P2, P3 and P4, P5 and P6, which determines the timing of the charging for the calculation of the correction voltage, is equal to the spacing Ta between the pulses P7 and P8, P9 and P10, P11 and P12, which determines the integral timing in the ranging operation. The spacing tb from the rise of the pulse P2 to the fall of the pulse P3 is also equal to the spacing Tb from the rise of the pulse P8 to the fall of the pulse P9.

After distance computation values corresponding to a predetermined number of emissions have been entered into the integrating capacitor 6, the CPU 1 reads the integral result of distance computation values by the integrating capacitor 6, as an AF signal. The CPU 1 also reads the reference voltage of the integrating capacitor 6 preliminarily stored in the EEPROM 2. Then the CPU 1 calculates the corrected AF signal Ra by substituting the reference voltage, the correction voltage, and the AF signal into above Eq. (1) and further detects the distance to the object, based on this corrected AF signal Ra. Since the integrating capacitor 6 is charged by the constant current source 63 at the timing equal to the integral timing in the ranging operation in the distance measuring apparatus of the present embodiment, the CPU 1 calculates the correction voltage under circumstances close to those in actual ranging and thus can further improve the ranging accuracy.

It is noted that the spacing tb from the rise of the pulse P2 to the fall of the pulse P3 can be set smaller than the spacing Tb from the rise of the pulse P8 to the fall of the pulse P9. This permits the ranging routine to be completed within shorter time. In addition, since the integrating capacitor 6 is not charged during the spacing tb, the accuracy is not degraded in detection of the capacitance of the integrating capacitor 6.

This method of charging the integrating capacitor 6 at the timing equal to the integral timing in the ranging operation can also be applied to the second to eighth embodiments, without having to be limited to the first embodiment.

The invention accomplished by the inventor was described above in detail based on the embodiments thereof, but it is noted that the present invention is by no means limited to each of the above embodiments. For example, for the integration of distance computation values, the distance computation values may also be integrated by preliminarily storing charge in the integrating capacitor and discharging the integrating capacitor with input of distance computation values.

As detailed above, the distance measuring apparatus according to the present invention can reduce the ranging error due to the change in the capacitance of the integrating capacitor, because the detecting means calculates the distance to the object with also taking account of the reference voltage, e.g., that immediately after manufacturing of the distance measuring apparatus and the correction voltage in actual ranging, in addition to the distance data.

Another distance measuring apparatus according to the present invention can also reduce the ranging error due to the change in the capacitance of the integrating capacitor, because the distance to the object is calculated, also taking account of the reference capacitance, e.g., that immediately after manufacturing of the distance measuring apparatus and the correction capacitance in actual ranging, in addition to the distance data.

Further, another distance measuring apparatus according to the present invention can reduce the ranging error due to the change in the capacitance of the integrating capacitor, because the distance to the object is calculated, also taking account of the reference charge time, e.g., that immediately after manufacturing of the distance measuring apparatus and the correction charge time in actual ranging, in addition to the distance data.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus comprising:
   light projecting means for projecting a light beam toward an object at a distance to be measured;
   light detecting means for detecting reflected light of the light beam projected toward and reflected from the object, at a reception position according to the distance to the object and outputting a position signal according to the reception position;
   computing means for performing an operation based on the position signal from said light detecting means to generate a distance computation value according to the distance to the object;
   integrating means comprising an integrating capacitor, said integrating means charging or discharging said integrating capacitor according to the distance computation value generated by said computing means to integrate the distance computation value;
   detecting means for detecting the distance to the object, based on distance data corresponding to the distance computation value integrated in said integrating means;
   charging means for charging said integrating capacitor by supplying a constant current for a fixed time; and
   voltage calculating means for calculating a voltage of said integrating capacitor after charging by said charging means, wherein said detecting means detects the distance to the object, based on a correction voltage calculated by said voltage calculating means in a ranging routine, a reference voltage of said integrating capacitor preliminarily calculated before executing the ranging routine, and the distance data.

2. The distance measuring apparatus according to claim 1, wherein said detecting means detects the distance to the object, based on corrected distance data Ra determined by the following equation:

$$Ra=(\alpha1/\beta1)\times D$$

where D is the distance data, $\alpha1$ is the reference voltage, and $\beta1$ is the correction voltage.

3. The distance measuring apparatus according to claim 1, wherein said detecting means detects the distance to said object, based on corrected distance data Rb determined by the following equation:

$$Rb=[\alpha1/\{(\beta1-\alpha1)\times A+\alpha1\}]\times D+(\beta1-\alpha1)\times B$$

(where D is said distance data, $\alpha1$ is said reference voltage, $\beta1$ is said correction voltage, and A and B are correction coefficients).

4. The distance measuring apparatus according to claim 1, wherein when a difference between said correction voltage and said reference voltage is smaller than a predetermined value, said detecting means detects the distance to said object, based on corrected distance data Ra determined by the following equation:

$$Ra=(\alpha1/\beta1)\times D$$

(where D is said distance data, $\alpha1$ is said reference voltage, and $\beta1$ is said correction voltage), and
wherein when the difference between said correction voltage and said reference voltage is not less than the predetermined value, said detecting means detects the distance to said object, based on corrected distance data Rb determined by the following equation:

$$Rb=[\alpha1/\{(\beta1-\alpha1)\times A+\alpha1\}]\times D+(\beta1-\alpha1)\times B$$

(where A and B are correction coefficients).

5. The distance measuring apparatus according to claim 1, wherein said voltage calculating means calculates the correction voltage before ranging.

6. The distance measuring apparatus according to claim 1, wherein said voltage calculating means calculates the correction voltage after ranging.

7. The distance measuring apparatus according to claim 1, wherein said voltage calculating means calculates the voltage of said integrating capacitor before and after ranging, and
   wherein said detecting means determines an average of the voltage before ranging and the voltage after ranging and detects the distance to the object, using the average as the correction voltage.

8. A distance measuring apparatus comprising:
   light projecting means for projecting a light beam toward an object at a distance to be measured;
   light detecting means for detecting reflected light of the light beam projected toward and reflected from the object, at a reception position according to the distance to the object and outputting a position signal according to the reception position;
   computing means for performing an operation based on the position signal output from said light detecting means to generate a distance computation value according to the distance to the object;
   integrating means comprising an integrating capacitor, said integrating means charging or discharging said integrating capacitor according to the distance computation value generated by said computing means to integrate the distance computation value;
   detecting means for detecting the distance to the object, based on distance data corresponding to the distance computation value integrated in said integrating means;
   charging means for charging said integrating capacitor by supplying a constant current for a fixed time; and
   capacitance calculating means for calculating capacitance of said integrating capacitor after charging by said charging means, wherein said detecting means detects the distance to the object, based on a correction capacitance calculated by said capacitance calculating means in a ranging routine, a reference capacitance of said integrating capacitor preliminarily calculated before executing the ranging routine, and the distance data.

9. The distance measuring apparatus according to claim 8, wherein said detecting means detects the distance to the object, based on corrected distance data Rc determined by the following equation:

$$Rc=(\alpha2/\beta2)\times D$$

where D is the distance data, $\alpha2$ is the reference capacitance, and $\beta2$ is the correction capacitance.

10. The distance measuring apparatus according to claim 8, wherein said detecting means detects the distance to said object, based on corrected distance data Rd determined by the following equation:

$$Rd=[\beta 2/\{(\alpha 2-\beta 2)\times A+\beta 2\}]\times D+(\alpha 2-\beta 2)\times B$$

(where D is said distance data, $\alpha 2$ is said reference capacitance, $\beta 2$ is said correction capacitance, A and B are correction coefficients).

11. The distance measuring apparatus according to claim 8, wherein when a difference between said correction capacitance and said reference capacitance is smaller than a predetermined value, said detecting means detects the distance to said object, based on corrected distance data Rc determined by the following equation:

$$Rc=(\beta 2/\alpha 2)\times D$$

(where D is said distance data, $\alpha 2$ is said reference capacitance, and $\beta 2$ is said correction capacitance), and wherein when the difference between said correction capacitance and said reference capacitance is not less than the predetermined value, said detecting means detects the distance to said object, based on corrected distance data Rd determined by the following equation:

$$Rd=[\beta 2/\{(\alpha 2-\beta 2)\times A+\beta 2\}]\times D+(\alpha 2-\beta 2)\times B$$

(where A and B are correction coefficients).

12. The distance measuring apparatus according to claim 8, wherein said capacitance calculating means calculates the correction capacitance before ranging.

13. The distance measuring apparatus according to claim 8, wherein said capacitance calculating means calculates the correction capacitance after ranging.

14. The distance measuring apparatus according to claim 8, wherein said capacitance calculating means calculates the capacitance of said integrating capacitor before and after ranging, and wherein said detecting means determines an average of the capacitance before ranging and the capacitance after ranging and detects the distance to the object, using the average as the correction capacitance.

15. A distance measuring apparatus comprising:

light projecting means for projecting a light beam toward an object at a distance to be measured;

light detecting means for detecting reflected light of the light beam projected toward and reflected from the object, at a reception position according to the distance to the object and outputting a position signal according to the reception position;

computing means for performing an operation based on the position signal outputted from said light detecting means to generate a distance computation value according to the distance to the object;

integrating means comprising an integrating capacitor, said integrating means charging or discharging said integrating capacitor according to the distance computation value generated by said computing means to integrate the distance computation value;

detecting means for detecting the distance to the object, based on distance data corresponding to the distance computation value integrated in said integrating means;

charging means for charging said integrating capacitor to a predetermined voltage by supplying a constant current to said integrating capacitor; and charge time calculating means for calculating a time that elapses before a voltage of said integrating capacitor reaches the predetermined voltage, wherein said detecting means detects the distance to the object, based on a correction charge time calculated by said charge time calculating means in a ranging routine, a reference charge time of said integrating capacitor preliminarily calculated before executing the ranging routine, and the distance data.

16. The distance measuring apparatus according to claim 15, wherein said detecting means detects the distance to the object, based on corrected distance data Re determined by the following equation:

$$Re=(\alpha 3/\beta 3)\times D$$

where D is the distance data, $\alpha 3$ is the reference capacitance, and $\beta 3$ is the correction capacitance.

17. The distance measuring apparatus according to claim 15, wherein said detecting means detects the distance to said object, based on corrected distance data Rf determined by the following equation:

$$Rf=[\alpha 3/\{(\beta 3-\alpha 3)\times A+\alpha 3\}]\times D+(\beta 3-\alpha 3)\times B$$

(where D is said distance data, $\alpha 3$ is said reference charge time, $\beta 3$ is said correction charge time, and A and B are correction coefficients).

18. The distance measuring apparatus according to claim 15, wherein when a difference between said correction charge time and said reference charge time is smaller than a predetermined value, said detecting means detects the distance to said object, based on corrected distance data Re determined by the following equation:

$$Re=(\alpha 3/\beta 3)\times D$$

(where D is said distance data, $\alpha 3$ is said reference charge time, and $\beta 3$ is said correction charge time), and wherein when the difference between said correction charge time and said reference charge time is not less than the predetermined value, said detecting means detects the distance to said object, based on corrected distance data Rf determined by the following equation:

$$Rf=[\alpha 3/\{(\beta 3-\alpha 3)\times A+\alpha 3\}]\times D+(\beta 3-\alpha 3)\times B$$

(where A and B are correction coefficients).

19. The distance measuring apparatus according to claim 15, wherein said charge time calculating means calculates the correction charge time before ranging.

20. The distance measuring apparatus according to claim 15, wherein said charge time calculating means calculates the correction charge time after ranging.

21. The distance measuring apparatus according to claim 15, wherein said charge time calculating means calculates the charge time of said integrating capacitor before and after ranging, and wherein said detecting means determines an average of the charge time before ranging and the charge time after ranging and detects the distance to the object, using the average as the correction charge time.

22. The distance measuring apparatus according to claim 1, wherein said integrating means integrates the distance computation value, based on a predetermined timing signal, and said charging means charges said integrating capacitor for a time equal to duration of the timing signal.

* * * * *